(12) United States Patent
Yokoyama et al.

(10) Patent No.: US 11,792,372 B2
(45) Date of Patent: Oct. 17, 2023

(54) PROJECTOR

(71) Applicant: Sharp Fukuyama Laser Co., Ltd., Fukuyama (JP)

(72) Inventors: Aisaku Yokoyama, Fukuyama (JP); Satoru Tamura, Fukuyama (JP); Junpei Ooi, Fukuyama (JP)

(73) Assignee: Sharp Fukuyama Laser Co., Ltd., Fukuyama (JP)

( * ) Notice: Subject to any disclaimer, the term of this patent is extended or adjusted under 35 U.S.C. 154(b) by 0 days.

(21) Appl. No.: 17/675,803

(22) Filed: Feb. 18, 2022

(65) Prior Publication Data

US 2022/0272309 A1    Aug. 25, 2022

(30) Foreign Application Priority Data

Feb. 22, 2021   (JP) ................................. 2021-026070

(51) Int. Cl.
*H04N 9/31* (2006.01)
*G03B 21/20* (2006.01)
*G02B 13/16* (2006.01)

(52) U.S. Cl.
CPC .......... *H04N 9/3129* (2013.01); *G02B 13/16* (2013.01)

(58) Field of Classification Search
CPC ............... H04N 9/3129; H04N 9/3164; G03B 21/2033; G03B 21/2013; G03B 21/208; G02B 26/101
See application file for complete search history.

(56) References Cited

U.S. PATENT DOCUMENTS

2012/0200833 A1\* 8/2012 Imai ........................ G02B 3/08
                                                              353/30
2019/0033564 A1    1/2019 Ichikawa et al.

FOREIGN PATENT DOCUMENTS

JP          2017-125942 A     7/2017

\* cited by examiner

*Primary Examiner* — Ryan D Howard
(74) *Attorney, Agent, or Firm* — ScienBiziP, P.C.

(57) ABSTRACT

A projector includes: a laser light source; a shaping section configured to shape a laser light emitted from the laser light source; and a scanning section configured to two-dimensionally scan, on a screen, a laser beam shaped by the shaping section. Under a situation where a distance from an optical emitting surface of the laser beam to the screen is constant, the laser light source and the shaping section are configured to perform two-dimensional scanning of the laser beam on the screen by using a tip of the laser beam corresponding to each of cross sections at a plurality of positions of a tapered portion of the laser beam from the scanning section to a beam waist of the laser beam.

11 Claims, 22 Drawing Sheets

PROJECTOR

CROSS-REFERENCE TO RELATED APPLICATION

The present application claims priority from Japanese Patent Application Number 2021-26070, the content to which is hereby incorporated by reference into this application.

BACKGROUND OF THE INVENTION

1. Field of the Invention

Technical Field

The present disclosure relates to a projector.

2. Description of the Related Art

In recent years, projectors using laser beams have been developed. Such a projector is disclosed, for example, in JP 2017-125942 A that will be described below. The projector includes a laser light source, a shaping section configured to shape, into a laser beam, a laser light emitted from the laser light source, and a scanning section configured to two-dimensionally scan, on a screen, the laser beam shaped by the shaping section.

SUMMARY OF THE INVENTION

The projector described above is used under a situation where a distance between the projector and the screen is variable. Thus, only a portion of a laser beam where a beam size increases as a distance from an optical emitting surface increases is projected onto the screen. This allows an image to be projected onto the screen even when the projector and the screen are separated at any distance. However, a portion of a laser beam where the beam size decreases as a distance from the optical emitting surface increases is not projected onto the screen. Thus, the projector described above has constraints on the design. Thus, for example, the following problems arise.

When an image is projected onto the screen by using the projector described above, incident angles of a laser beam to each pixel on the screen are different. As such, a difference between the minimum and maximum values of a spot size of the laser beam at each pixel on the screen may be quite large. Accordingly, there is a need for a technique for achieving uniformization of a spot size at each pixel on the screen, that is, a size of each pixel.

As can be seen from the above, when only the portion of the laser beam where the beam size increases as the distance from the optical emitting surface increases is used, various problems arise due to constraints on the design of the projector.

One aspect of the present disclosure is to provide a projector that can solve various problems caused by constraints on the design.

A projector according to one aspect of the present disclosure includes a laser light source, a shaping section configured to shape a laser light emitted from the laser light source, and a scanning section configured to two-dimensionally scan, on a screen, a laser beam shaped by the shaping section, wherein under a situation where a distance from an optical emitting surface of the laser beam to the screen is constant, the laser light source and the shaping section are configured to perform two-dimensional scanning of the laser beam on the screen by using a tip of the laser beam corresponding to each of cross sections at a plurality of positions of a tapered portion of the laser beam from the scanning section to a beam waist of the laser beam.

A projector according to one aspect of the present disclosure includes a laser light source, a shaping section configured to shape a laser light emitted from the laser light source, and a scanning section configured to two-dimensionally scan, on a screen, a laser beam shaped by the shaping section in a first direction and a second direction perpendicular to the first direction, wherein the laser light source and the shaping section are configured to satisfy a predetermined condition to be described below in each of the first direction and the second direction, the predetermined condition including, when a position on the screen where an incident angle of the laser beam is smallest and a projection distance of the laser beam is smallest is defined as a first pixel, a position on the screen where an incident angle of the laser beam is smallest and a projection distance of the laser beam is largest is defined as a second pixel, a position on the screen where an incident angle of the laser beam is largest and a projection distance of the laser beam is smallest is defined as a third pixel, and a position on the screen where an incident angle of the laser beam is largest and a projection distance of the laser beam is largest is defined as a fourth pixel, a graph of a beam propagation characteristic illustrating a relationship between a beam size of the laser beam and the projection distance including a decreasing portion drawn in such a manner that as the projection distance increases, the beam size decreases, and at least a part of a line of the decreasing portion being drawn overlapping a specific region surrounded by a first graph, a second graph, a third graph, and a fourth graph that are to be described below, the first graph illustrating a relationship between the beam size and the projection distance for a 1-2 pixel row from the first pixel to the second pixel in a case where sizes of all pixels on the screen are assumed to be identical, the second graph illustrating a relationship between the beam size and the projection distance for a 2-4 pixel row from the second pixel to the fourth pixel in a case where sizes of all pixels on the screen are assumed to be identical, the third graph illustrating a relationship between the beam size and the projection distance for a 4-3 pixel row from the fourth pixel to the third pixel in a case where sizes of all pixels on the screen are assumed to be identical, and the fourth graph illustrating a relationship between the beam size and the projection distance for a 3-1 pixel row from the third pixel to the first pixel in a case where sizes of all pixels on the screen are assumed to be identical.

DETAILED DESCRIPTION OF THE INVENTION

Figure 1:
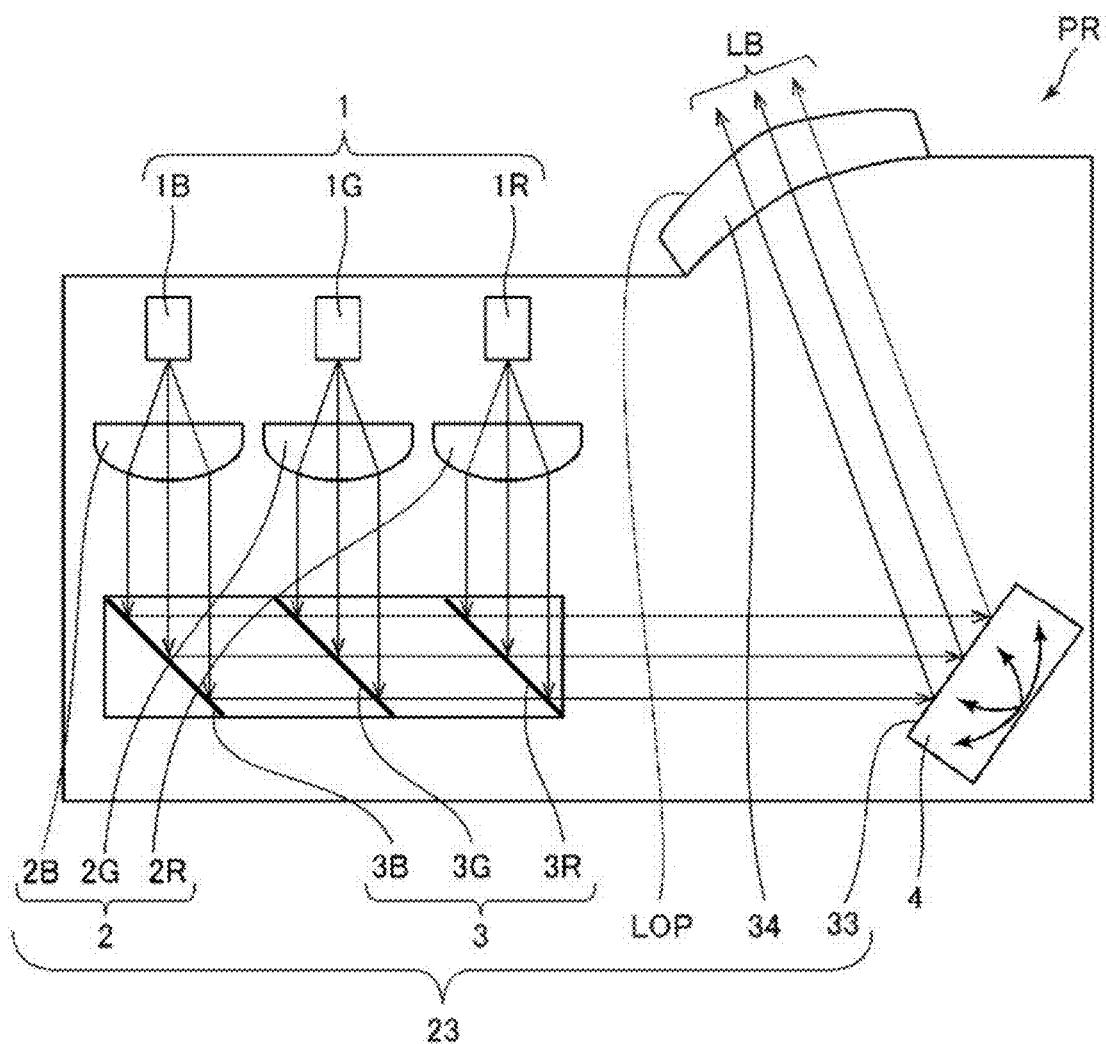
FIG. 1 is a schematic view illustrating an overall configuration of a projector according to a first embodiment.

A projector according to the embodiments of the present disclosure will be described below with reference to the drawings. In the drawings, identical or equivalent elements are given the same reference signs, and redundant descriptions of the identical or equivalent elements are not repeated if not necessary.

First Embodiment

As illustrated in FIG. 1, a projector PR includes a plurality of laser light sources 1, a plurality of optical systems 23, and a scanning section 4. The plurality of laser light sources 1 and the plurality of optical systems 23 correspond to each other in a one-to-one relationship. In the present embodiment, laser beams LB emitted from an optical emitting surface LOP of the projector PR are projected on each pixel constituting a screen S having a planar and rectangular shape. In the present embodiment, the screen S refers to a projection surface of the laser beam LB and does not mean an actual object. The screen S may be formed on a surface of any object such as a surface of a hanging screen material, a surface of a wall, a ceiling, or a floor, or an upper face of a desk.

The plurality of laser light sources 1 include a red laser light source 1R, a green laser light source 1G, and a blue laser light source 1B. The red laser light source 1R, the green laser light source 1G, and the blue laser light source 1B are respectively constituted by laser diodes that emit laser lights within specific wavelength ranges of red, green, and blue. However, the respective laser light sources constituting the plurality of laser light sources 1 are not limited to the red laser light source 1R, the green laser light source 1G, and the blue laser light source 1B, and may emit a laser light having any color as long as the projector PR is capable of displaying an image on the screen S. Furthermore, the number of the plurality of laser light sources 1 is not limited to three, and may be any number as long as the projector PR is capable of displaying an image on the screen S.

Each of the plurality of optical systems 23 includes a plurality of shaping sections 2 that shape a plurality of laser lights individually emitted from the plurality of laser light sources 1 into parallel laser beams to generate the laser beams LB. The plurality of shaping sections 2 include a red collimator lens 2R, a green collimator lens 2G, and a blue collimator lens 2B. Note that each of the red collimator lens 2R, the green collimator lens 2G, and the blue collimator lens 2B functions as a shaping section that shapes laser lights into parallel light beams to generate laser beams.

Further, the optical system 23 includes a multiplexing section 3 that multiplexes a plurality of laser beams and generates the laser beam LB to be emitted from the optical emitting surface LOP. The multiplexing section 3 includes a red dichroic mirror 3R, a green dichroic mirror 3G, and a blue dichroic mirror 3B. Thus, by synthesizing the colors of the plurality of laser beams, a desired color can be created.

When a path of a light emitted from each of the red laser light source 1R, the green laser light source 1G, and the blue laser light source 1B is individually seen, the plurality of optical systems 23 includes a red optical system, a green optical system, and a blue optical system. The red optical system includes the red collimator lens 2R and the red dichroic mirror 3R. The green optical system includes the green collimator lens 2G and the green dichroic mirror 3G. The blue optical system includes the blue collimator lens 2B and the blue dichroic mirror 3B. Note that the plurality of optical systems 23 include a Micro-Electro-Mechanical Systems (MEMS) mirror 33 and a free form lens 34 that are a common optical system for the laser beams LB having respective wavelengths of red, green, and blue.

The free form lens 34 is for compensating scanning lines, and the projector PR does not need to include the free form lens 34.

The red collimator lens 2R, the green collimator lens 2G, and the blue collimator lens 2B respectively shape red laser lights emitted by the red laser light source 1R, green laser lights emitted by the green laser light source 1G, and blue laser lights emitted by the blue laser light source 1B. As a result, the red collimator lens 2R, the green collimator lens 2G, and the blue collimator lens 2B respectively generate red laser beams, green laser beams, and blue laser beams.

The blue dichroic mirror 3B reflects blue laser beams. The green dichroic mirror 3G reflects green laser beams but transmits blue laser beams. The red dichroic mirror 3R reflects red laser beams but transmits blue and green laser beams. Thus, the red dichroic mirror 3R, the green dichroic mirror 3G, and the blue dichroic mirror 3B respectively multiplex the red laser beams, the blue laser beams, and the green laser beams. Note that the red laser beam, the green laser beam, and the blue laser beam are multiplexed at the multiplexing section 3 to form one laser beam LB.

In the present embodiment, the plurality of laser beams to be multiplexed by the multiplexing section 3 are a red laser beam, a green laser beam, and a blue laser beam. However, the plurality of laser beams to be multiplexed by the multiplexing section 3 are not limited thereto, and may be any laser beams as long as the laser beams have different peak wavelengths from one another.

Note that in the present embodiment, the red dichroic mirror 3R, the green dichroic mirror 3G, and the blue dichroic mirror 3B are an integrated prism. However, the red dichroic mirror 3R, the green dichroic mirror 3G, and the blue dichroic mirror 3B may be separately installed.

As can be seen from the above, each of the plurality of shaping sections 2 shapes laser lights emitted by corresponding one of the plurality of laser light sources 1 to generate the laser beam LB. The laser beam LB is emitted from the optical emitting surface LOP of the projector PR to the outside of the projector PR. The optical emitting surface LOP of the projector PR is a surface of the outermost of the optical systems 23 in the projector PR.

Figure 2:
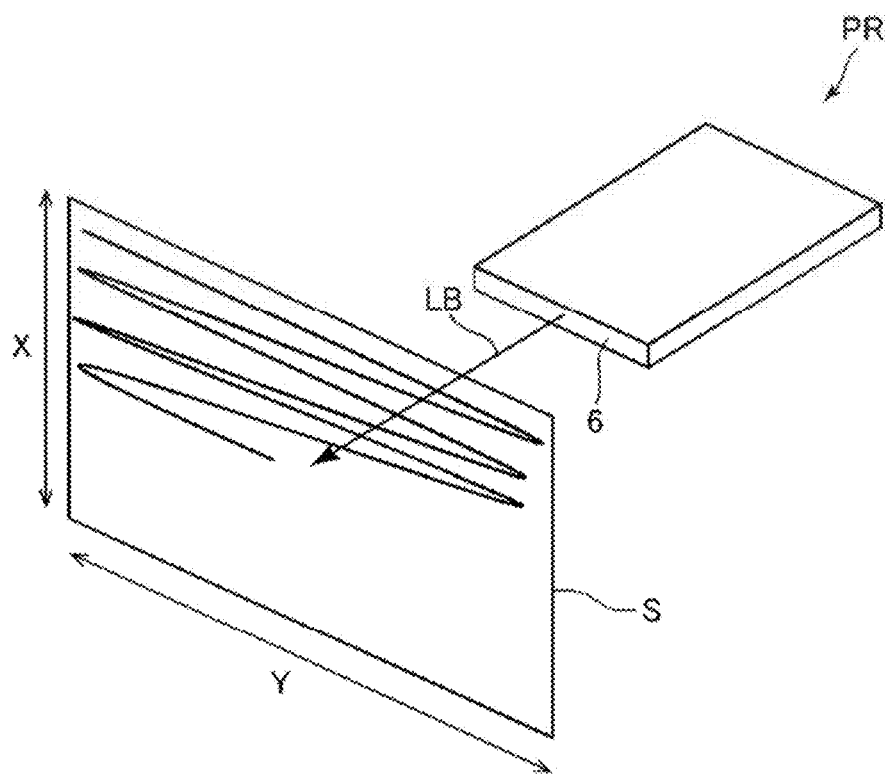
FIG. 2 is a schematic view illustrating a track of scanning of the projector according to the first embodiment.

As illustrated in FIG. 2, the scanning section 4 two-dimensionally scans, on the screen S, the laser beams LB shaped by the plurality of shaping sections 2 in a first direction, for example, an X-axis direction, and a second direction perpendicular to the first direction, for example, a Y-axis direction. The scanning section 4 performs two-dimensional scanning by minute-vibrating the MEMS mirror 33.

Due to this, for example, a projection position of the laser beam LB moves along a virtual pixel row from a pixel at one end to a pixel at the other end on the screen S having a rectangular shape in the X-axis direction (first direction). Thereafter, the projection position of the laser beam LB moves along a virtual pixel row from a pixel at the other end to a pixel at the one end with only one pixel shifted in the Y-axis direction (second direction) on the screen S having the rectangular shape.

The projection position of the laser beam LB moves all pixels of a pixel group in a matrix shape on the screen S having the rectangular shape by the reciprocating scanning described above by the scanning section 4 in the X-axis direction and the sequentially progressing scanning described above by the scanning section 4 in the Y-axis direction.

Figure 3:
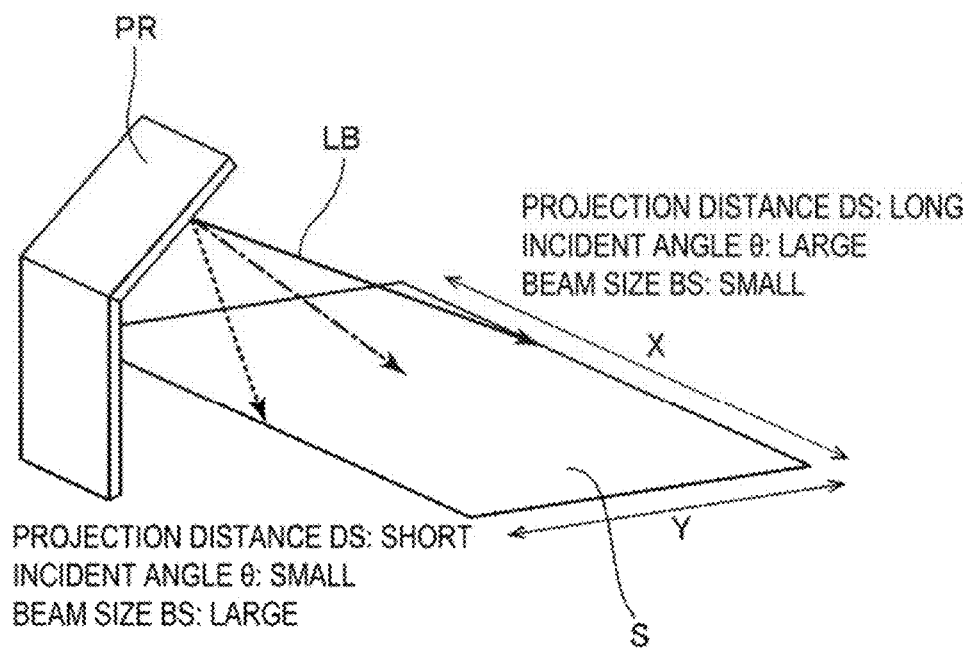
FIG. 3 is a diagram for describing a relationship among a projection distance from an optical emitting surface to each pixel on a screen, an incident angle of a laser beam to each pixel on the screen, and a beam size corresponding to each pixel of the screen.
Figure 4:
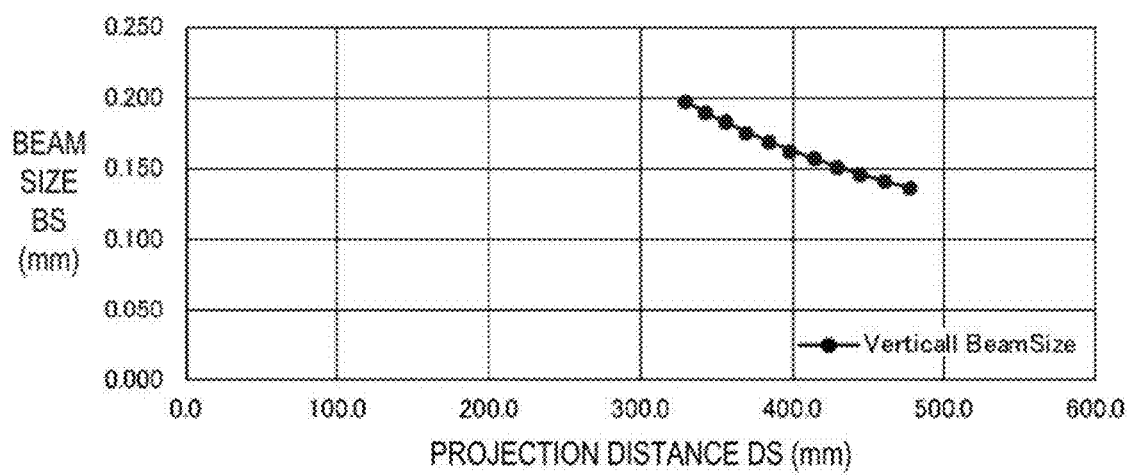
FIG. 4 is a graph illustrating a relationship between a beam size and a projection distance.

As illustrated in FIG. 3 and FIG. 4, in order to substantially match sizes of pixels PX with each other, the longer a projection distance DS from the optical emitting surface LOP (see FIG. 1) of the projector PR to the screen S, the larger an incident angle θ of the laser beam LB with respect to the screen S becomes, and the smaller a beam size BS becomes. In other words, the shorter the projection distance DS from the optical emitting surface LOP (see FIG. 1) of the projector PR to the screen S, the smaller the incident angle θ of the laser beam LB with respect to the screen S becomes, and the larger the beam size BS becomes.

In each of the first direction (X-axis direction) and the second direction (Y-axis direction), a plurality of laser beams LB, for example, a red laser beam, a green laser beam, and a blue laser beam preferably have an identical beam waist position. In this way, the respective sizes of the red laser beam, the green laser beam, and the blue laser beam can be substantially matched for each pixel PX on the screen S. Thus, the overall color of each pixel PX can be controlled to a desired color.

Figure 5:
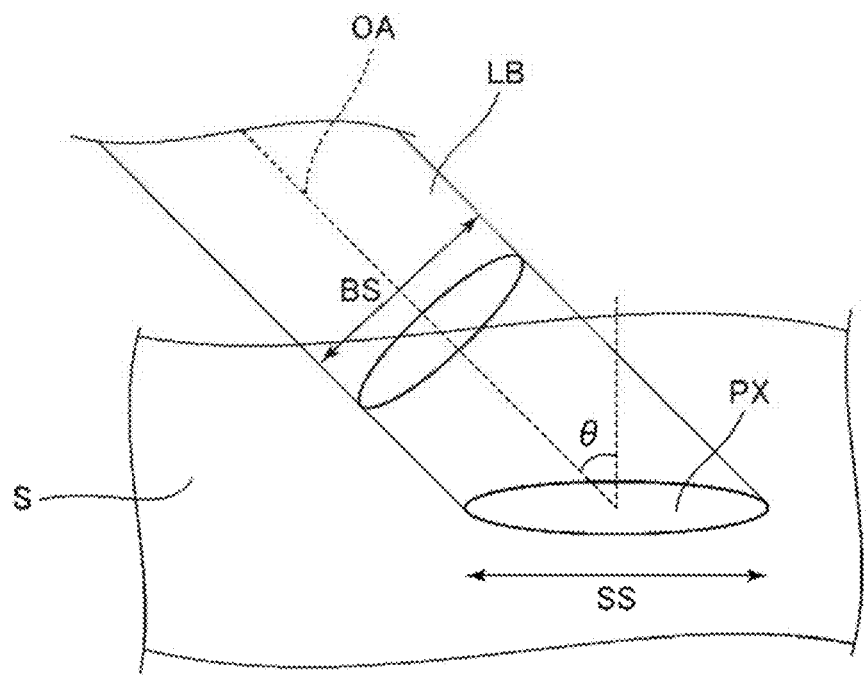
FIG. 5 is a diagram for describing a relationship between a beam size and a spot size.

FIG. 5 illustrates a relationship among the beam size BS, a spot size SS, and the incident angle θ to the screen S for the laser beam LB traveling along an optical axis OA. As illustrated in FIG. 5, a width of a virtual plane perpendicular to the optical axis OA of the laser beam LB is the beam size BS. A projection region of the laser beam LB on the screen S is the pixel PX. The width of the pixel PX is the spot size SS. An angle formed between the optical axis OA and a normal of the screen S is the incident angle θ of the laser beam LB to the screen S.

In a direction corresponding to each of the X-axis direction (first direction) and the Y-axis direction (second direction), the beam size BS is represented by a width in a cross section of the laser beam LB perpendicular to the optical axis OA. For example, when the cross section of the laser beam LB is circular, the width is a diameter of the circle. In each of the X-axis direction and the Y-axis direction, the spot size SS is a width of the projection surface of the laser beam LB projected onto the screen S, that is, a width of the pixel PX. Specifically, in a case where the incident angle θ of the optical axis OA of the laser beam LB with respect to the screen S is determined, the spot size SS, that is, the size of the pixel PX, is represented by the beam size BS/COS θ.

Figure 6:
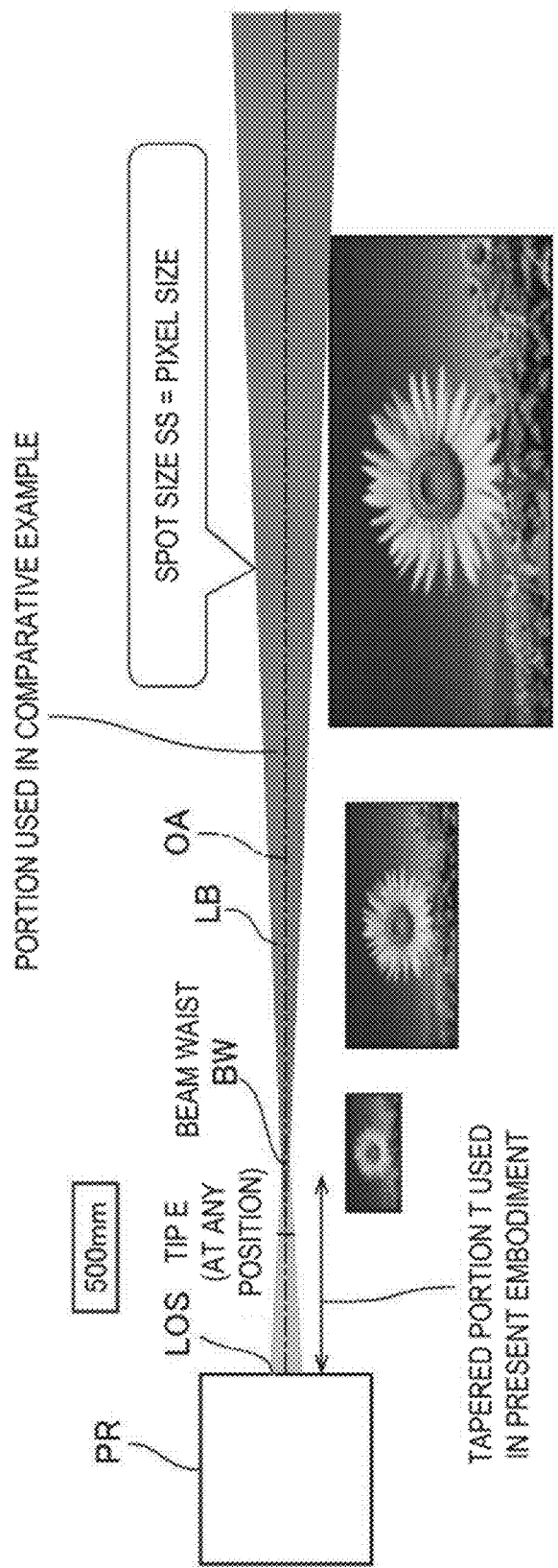
FIG. 6 is a schematic view illustrating a relationship between a spot size and a projection distance.
Figure 7:
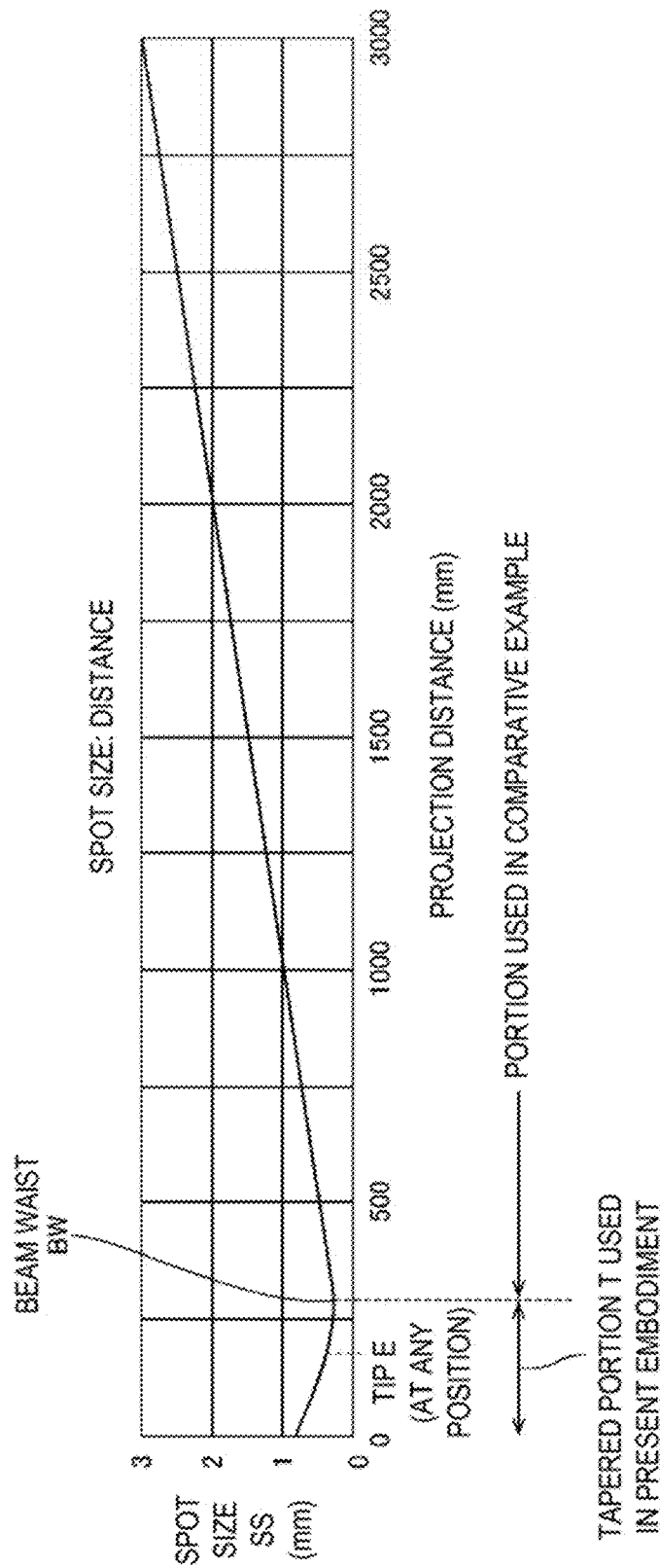
FIG. 7 is a graph illustrating a relationship between a spot size and a projection distance.

As illustrated in FIG. 6 and FIG. 7, when the projection distance DS that is a distance along the optical axis OA of the laser beam LB emitted from the optical emitting surface LOP of the projector PR increases, a portion where the spot size SS, that is, the size of the pixel PX, decreases, is included. As can be seen in FIG. 6 and FIG. 7, the laser beam LB has a beam waist BW with the smallest beam size BS.

As will be described below, the projector PR according to the present embodiment uses the laser beam LB in a portion closer to the optical emitting surface LOP of the projector PR than the beam waist BW. In other words, the laser beam LB in a portion where the beam size BS becomes smaller as a distance from the optical emitting surface LOP increases is used. In this regard, the projector PR according to the present embodiment differs from a projector of a comparative example in which only the laser beam LB in a portion where the beam size BS becomes larger as a distance from the optical emitting surface LOP increases is used.

The projector PR according to the present embodiment is used under a situation where a positional relationship between the projector PR and the screen S is fixed. That is, the projector is used under a condition where a distance of the laser beam LB from the optical emitting surface LOP to the screen S is constant. As described above, the screen S may be formed on a surface of any object such as a surface of a hanging screen material, a surface of a wall, or an upper face of a desk.

Additionally, the laser light source 1 and the shaping section 2 perform two-dimensional scanning of the laser beam LB on the screen S by using a tip E of the laser beam LB corresponding to each of cross sections at a plurality of positions of a tapered portion T of the laser beam LB from the scanning section 4 to the beam waist BW of the laser beam LB. The two-dimensional scanning in this case means that the tips E of the laser beam LB move so as to trace the respective plurality of pixels PX included in at least a part of the region on the screen S. In other words, the laser light source 1 and the shaping section 2 project, onto at least a part of the region on the screen S, the tip E of the laser beam LB corresponding to each of the cross sections at the plurality of positions of the tapered portion T of the laser beam LB from the scanning section 4 to the beam waist BW of the laser beam LB. That is, the tip E of the laser beam LB corresponding to each of cross sections at a plurality of positions of a conical portion where the beam size BS decreases as a distance from the projector PR increases is projected onto at least a part of the region on the screen S. This can solve a variety of problems due to constraints on the design. The above-described plurality of tips E of the laser beam LB may be cross sections at any plurality of positions from the scanning section 4 to the beam waist BW of the laser beam LB. A shape of each of the plurality of cross sections at the tips E of the laser beam LB on the screen S (identical to a shape of the pixel PX in FIG. 5) varies depending on a position of each of the plurality of pixels PX on at least a part of the region of the screen S.

The tip E of the laser beam LB corresponding to each of the cross sections at the plurality of positions of a portion of the laser beam LB where the beam size BS gradually increases may be projected onto another region other than at least the part of the region of the screen S. The cross sections of the plurality of tips of the laser beam LB in this case may be cross sections at any plurality of positions as long as the cross sections are at the plurality of positions at which a distance from the scanning section 4 is larger than that from the beam waist BW of the laser beam LB. Moreover, each of the shapes of the cross sections at the plurality of tips of the laser beam LB varies depending on a position of each of a plurality of pixels PX in another region other than at least the part of the region of the screen S.

The laser light source 1 and the shaping section 2 preferably perform two-dimensional scanning of the laser beam LB on the screen S by using only the tip of the laser beam LB corresponding to each of the cross sections at the plurality of positions of the tapered portion T of the laser beam LB from the scanning section 4 to the beam waist BW of the laser beam LB. The two-dimensional scanning in this case means that the tips E of the laser beam LB move so as to trace all the respective pixels PX included in the overall region on the screen S. In other words, it is preferable that the laser light source 1 and the shaping section 2 project, onto the screen S, only the tip E of the laser beam LB corresponding to each of the cross sections at the plurality of positions of the tapered portion T of the laser beam LB from the scanning section 4 to the beam waist BW of the laser beam LB. That is, it is preferable that the laser light source 1 and the shaping section 2 be configured so as to project, onto the overall region on the screen S, the tip E of the laser beam LB corresponding to each of the cross sections at the plurality of positions of the tapered portion T. Note that each of the shapes of the plurality of tips E of the laser beam LB (identical to the shape of the pixel PX in FIG. 5) on the screen S is different depending on the position of each of the plurality of pixels PX in the overall region on the screen S. According to this configuration, as will be described below, when it is desired to install the projector PR at a position outside positions facing the screen S, design for uniformizing the spot size SS can be easily achieved.

In the present embodiment, the scanning section 4 scans the laser beam LB such that the outline of the screen S has a rectangular shape. However, the outline of the screen S may have any shape other than the rectangular shape.

Figure 8:
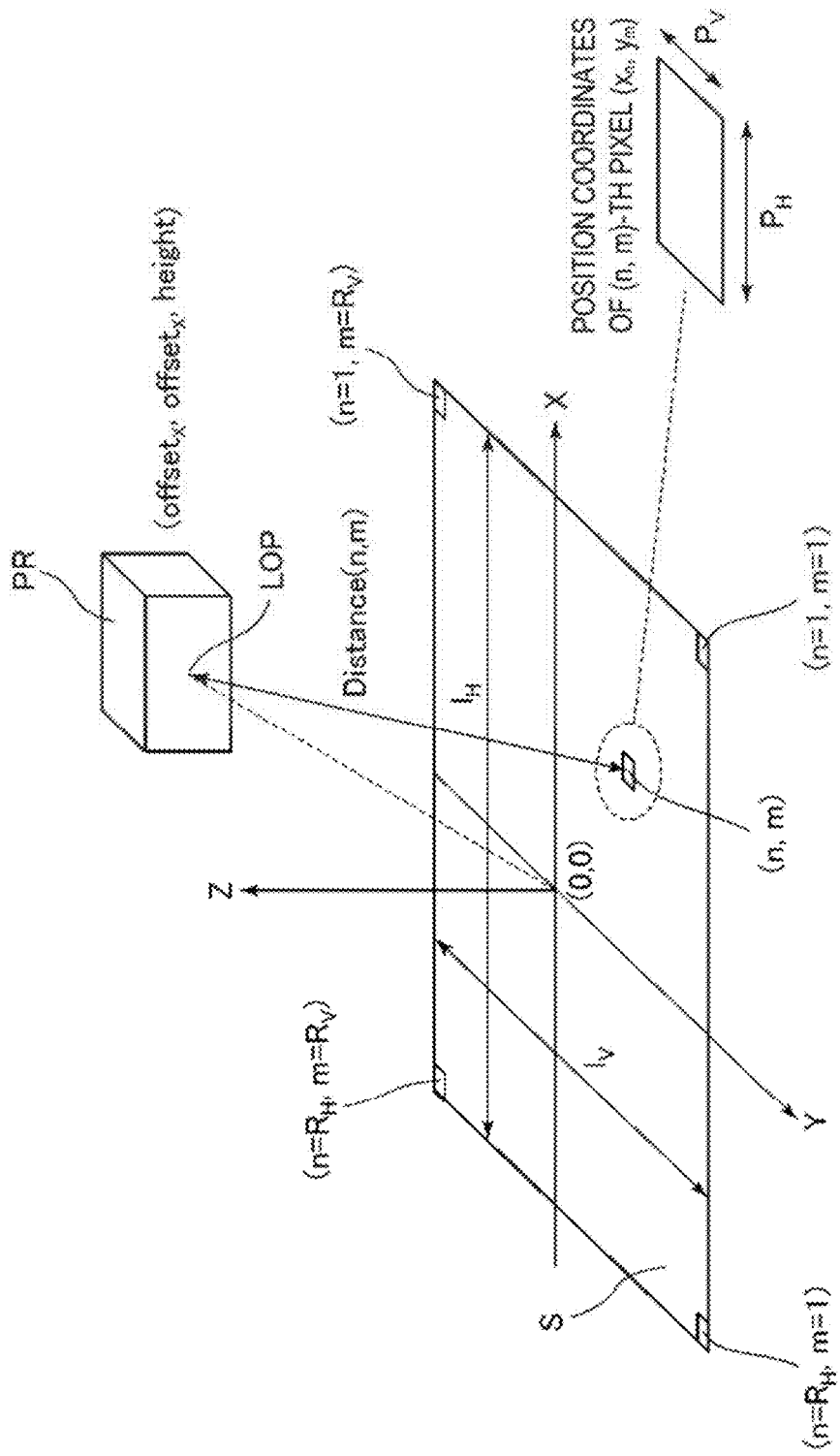
FIG. 8 is a perspective view illustrating a relationship between a position of the optical emitting surface of the projector and a position of a screen, which is common among embodiments.
Figure 9:
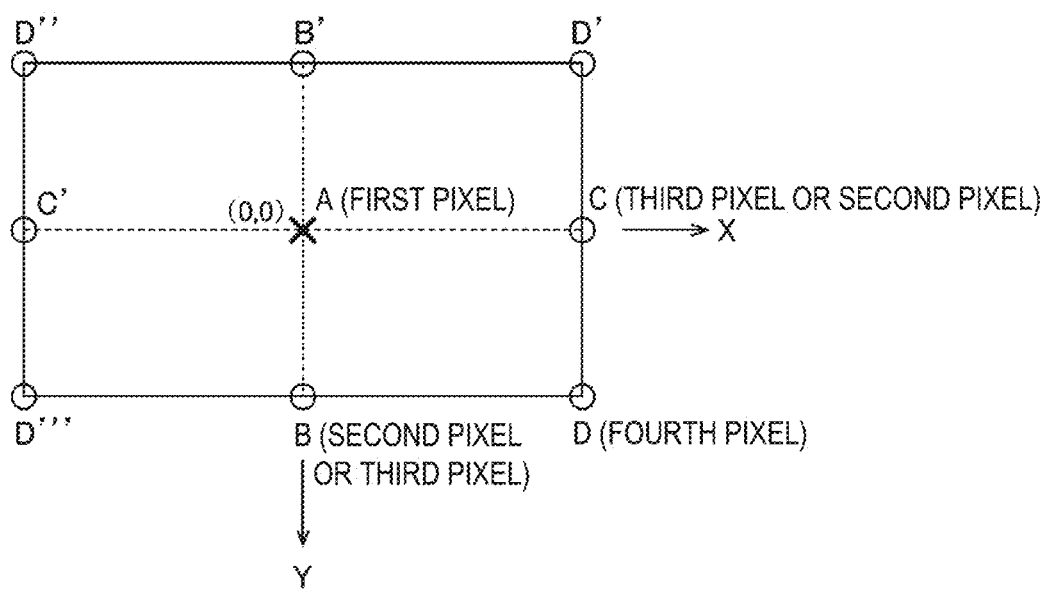
FIG. 9 is a front view for describing a relationship between a position of the optical emitting surface of the projector according to the first embodiment and a position of a screen.
Figure 10:
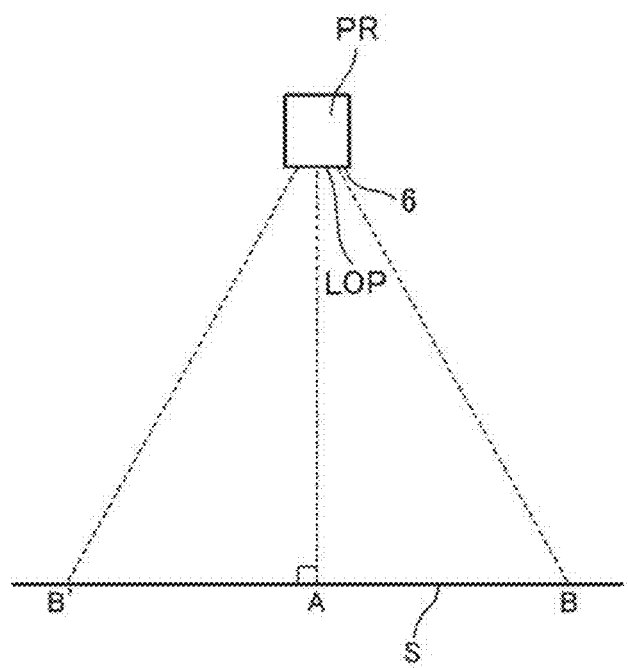
FIG. 10 is a diagram illustrating a relationship between a position of the optical emitting surface of the projector according to the first embodiment and a position of a screen, and is a side view of the projector and the screen when the projector and the screen are viewed along a horizontal direction (an X-axis direction, a first direction).
Figure 11:
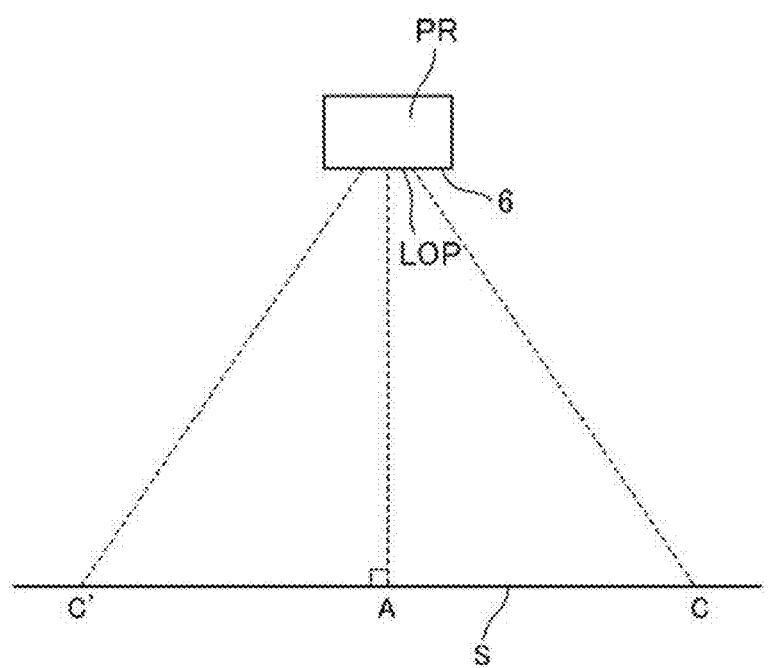
FIG. 11 is a diagram illustrating a relationship between a position of the optical emitting surface of the projector according to the first embodiment and a position of a screen, and is a side view of the projector and the screen when the projector and the screen are viewed along a vertical direction (a Y-axis direction, a second direction).

FIG. 8 illustrates each element for describing a relationship between the projector PR and the screen S. The definition of each element in FIG. 8 will be described below. FIG. 9 to FIG. 11 are diagrams for describing a relationship between a position of the optical emitting surface of the projector according to the first embodiment and a position of a screen. A specific region ABDC specified by a point A, a point B, a point D, and a point C in FIG. 9 to FIG. 11 is to be considered below. Note that the specific region ABDC has a rectangular shape.

As illustrated in FIG. 9 to FIG. 11, in the present embodiment, the optical emitting surface LOP of the projector PR is positioned as follows. A straight line that connects midpoints of short sides facing each other of a rectangular shape D'D"D'" is defined as a first virtual straight line. A straight line that connects midpoints of long sides facing each other of the rectangular shape D'D"D'" is defined as a second virtual straight line. The optical emitting surface LOP is provided at any position in a direction perpendicular to the screen S that is a region within the rectangular shape D'D"D'" from the point A that is an intersection point (0, 0) of the first virtual straight line and the second virtual straight line.

Note that the "rectangular shape D'D"D'"" of the present embodiment is specified by a line segment D-D', a line segment D'-D", a line segment D"-D'", and a line segment D'"-D that are arranged in a counterclockwise direction. The "short side" of the present embodiment is specified by the line segment D-D' or the line segment D"-D'". The "first virtual straight line" of the present embodiment is specified by the X-axis. The "long side" of the present embodiment is specified by the line segment D'-D" or the line segment D'"-D. The "second virtual straight line" of the present embodiment is specified by the Y-axis.

Under the conditions illustrated in FIG. 8 to FIG. 11, the relational equations of the following Equations 1 to 8 are established.

Screen size (horizontal): $l_H$ [Equation 1]
Screen size (vertical): $l_V$
$R_H$: Horizontal resolution
$R_V$: Vertical resolution
In a case of the screen $S$ described above,
the size of one pixel $PX$ (the spot size $SS$) is as follows.
The sizes of all the pixels $PX$ are identical.

$p_H = \dfrac{l_H}{R_H}$: Horizontal pixel size (identical in all of the pixels $PX$)

$p_V = \dfrac{l_V}{R_V}$: Vertical pixel size
(identical in all of the pixels $PX$)

When the pixel address is defined as $(n, m)$,
the following relationship is
represented by using the resolution $R_H$, $R_V$.
$(n, m)$ $n = 1, 2, \ldots, R_H$, $m = 1, 2, \ldots, R_V$ The position coordinates $(x_n, y_m)$ on the
projection surface of the pixel $PX$ address $(n, m)$
when the intersection point of the diagonal lines
of the screen $S$ having the rectangular shape is
defined as the origin $(0, 0)$ are represented as follows.

$$x_n = -\left(n - \dfrac{R_H + 1}{2}\right) p_H$$

$$y_n = -\left(m - \dfrac{R_V + 1}{2}\right) p_V$$

The position coordinates of the optical [Equation 2]
emitting surface $LOP$ are represented as follows.
(offset$_x$, offset$_y$, height)

The projection distance $DS$ from
the optical emitting surface $LOP$ to the
$(n, m)$-th pixel $PX$ is represented as follows.

$$\text{distance}(n, m) = \{(x_n - \text{offset}_x)^2 + (y_m - \text{offset}_y)^2 + \text{height}^2\}^{\frac{1}{2}} \quad (1)$$

[Equation 3]

$\theta_H(n, m) =$
$\tan^{-1}\left(\dfrac{x_n - \text{offset}_x}{\text{height}}\right)$: Incident angle in horizontal direction $\theta_V(n, m) = \tan^{-1}\left(\dfrac{y_m - \text{offset}_y}{\text{height}}\right)$:
Incident angle in vertical direction The incident angles $\theta_H(n, m)$, $\theta_V(n, m)$ from the optical emitting surface LOP to the $(n, m)$-th pixel PX are represented as follows.

[Equation 4]

Beamsize$_H(n, m) = p_H \cos\theta_H$: Incident angle in horizontal direction (2)

Beamsize$_V(n, m) = p_V \cos\theta_V$: Incident angle in vertical direction (3)

The beam size BS required for the $(n, m)$-th pixel PX is represented by the pixel sizes $p_H$ and $p_V$, and the incident angles $\theta_1$ and $\theta_V$ to the pixel PX.

[Equation 5]

Beamsize$_H(n, m) =$ $$p_H \cos\left\{\tan^{-1}\left(\dfrac{\sqrt{\text{distance}(n, m)^2 - \text{height}^2 - (y_m - \text{offset}_y)^2}}{\text{height}}\right)\right\}$$

Beamsize$_V(n, m) =$ $$p_V \cos\left\{\tan^{-1}\left(\dfrac{\sqrt{\text{distance}(n, m)^2 - \text{height}^2 - (x_n - \text{offset}_x)^2}}{\text{height}}\right)\right\}$$

The relational equations between the beam size BS required for the $(n, m)$-th pixel PX and the projection distance DS are derived from the above-described equations (1) to (3) as follows.

$$\text{Beamsize}_H = \sum_{m=1}^{R_V} \sum_{n=1}^{R_H} p_H \cos \quad \text{[Equation 6]}$$

$$\left\{\tan^{-1}\left(\dfrac{\sqrt{\text{distance}(n, m)^2 - \text{height}^2 - (y_m - \text{offset}_y)^2}}{\text{height}}\right)\right\}$$

$$\text{Beamsize}_V = \sum_{m=1}^{R_V} \sum_{n=1}^{R_H} p_V \cos$$

$$\left\{\tan^{-1}\left(\dfrac{\sqrt{\text{distance}(n, m)^2 - \text{height}^2 - (x_n - \text{offset}_x)^2}}{\text{height}}\right)\right\}$$

Since all the pixels PX are two-dimensionally present from $(1, 1)$ to $(R_H, R_V)$, the relational equations between the beam sizes BS and the projection distances DS for all the pixels PX are represented as follows.

$$A:(n, m) = \left(\dfrac{R_H}{2}, \dfrac{R_V}{2}\right), (x_n, y_m) = \left(\dfrac{p_H}{2}, \dfrac{p_V}{2}\right) \cong (0, 0) \quad \text{[Equation 7]}$$

$$B:(n, m) = \left(\dfrac{R_H}{2}, 1\right), (x_n, y_m) = \left(\dfrac{p_H}{2}, \dfrac{l_V - p_V}{2}\right) \cong \left(0, \dfrac{l_V}{2}\right)$$

$$C:(n, m) = \left(1, \dfrac{R_V}{2}\right), (x_n, y_m) = \left(\dfrac{l_H - p_H}{2}, \dfrac{p_V}{2}\right) \cong \left(\dfrac{l_H}{2}, 0\right)$$

$$D:(n, m) = (1, 1), (x_n, y_m) = \left(\dfrac{l_H - p_H}{2}, \dfrac{l_V - p_V}{2}\right) \cong \left(\dfrac{l_H}{2}, \dfrac{l_V}{2}\right)$$

The point A to the point D are represented as follows.

$$AC: \text{height} \leq \text{distance} \leq \sqrt{\left(\dfrac{l_H^2}{4} + \text{height}^2\right)} \quad \text{[Equation 8]}$$

$$\text{Beamsize}_H = p_H \cos\left\{\tan^{-1}\left(\dfrac{\sqrt{\text{distance}^2 - \text{height}^2}}{\text{height}}\right)\right\}$$

$$\text{Beamsize}_V = p_V \cos\left\{\tan^{-1}\left(\dfrac{p_V}{2\text{height}}\right)\right\} \cong p_V$$

$$CD: \sqrt{\left(\dfrac{l_H^2}{4} + \text{height}^2\right)} \leq \text{distance} \leq \sqrt{\left(\dfrac{l_H^2}{4} + \dfrac{l_V^2}{4} + \text{height}^2\right)}$$

Beamsize$_H =$ $$p_H \cos\left\{\tan^{-1}\left(\dfrac{l_H - p_H}{2\text{height}}\right)\right\} \cong p_H \cos\left\{\tan^{-1}\left(\dfrac{l_H}{2\text{height}}\right)\right\}$$

$$\text{Beamsize}_V = p_V \cos\left\{\tan^{-1}\left(\dfrac{\sqrt{\text{distance}^2 - \dfrac{l_H^2}{4} - \text{height}^2}}{\text{height}}\right)\right\}$$

-continued $$DB: \sqrt{\left(\frac{l_V^2}{4} + \text{height}^2\right)} \leq \text{distance} \leq \sqrt{\left(\frac{l_H^2}{4} + \frac{l_V^2}{4} + \text{height}^2\right)}$$

$$\text{Beamsize}_H = p_H \cos\left\{\tan^{-1}\left(\frac{\sqrt{\text{distance}^2 - \frac{l_V^2}{4} - \text{height}^2}}{\text{height}}\right)\right\}$$

$$\text{Beamsize}_V =$$
$$p_V \cos\left\{\tan^{-1}\left(\frac{l_H - p_V}{2\text{height}}\right)\right\} \cong p_V \cos\left\{\tan^{-1}\left(\frac{l_H}{2\text{height}}\right)\right\}$$

$$AB: \text{height} \leq \text{distance} \leq \sqrt{\left(\frac{l_V^2}{4} + \text{height}^2\right)}$$

$$\text{Beamsize}_H = p_H \cos\left\{\tan^{-1}\left(\frac{p_H}{2\text{height}}\right)\right\} \cong p_H$$

$$\text{Beamsize}_V = p_V \cos\left\{\tan^{-1}\left(\frac{\sqrt{\text{distance}^2 - \frac{p_H^2}{4} - \text{height}^2}}{\text{height}}\right)\right\}$$

In a case where the optical emitting surface LOP is directly above the center (0, 0) of the screen S, the relationship between the beam size BS and the projection distance DS for the pixel row that is represented by each of the line segments AC, CD, DB, and AB is represented by the following equations.
A graph of beam characteristics (the beam size BS vs. the projection distance DS) indicating each relationship of Beamsize$_H$(distance) and Beamsize$_V$(distance) overlapping the specific region ABDC is selected.

The relational equation between the beam size BS (Beamsize$_H$, Beamsize$_V$) and the projection distance (distance) DS for each of the above-described line segments AC, CD, DB, and AB in Equation 8 is a relational equation in a case where the sizes of all the pixels PX on the screen S are assumed to be perfectly uniform, that is, to be identical. As can be seen from Equation 8, when position coordinates (offset$_X$, offset$_Y$, height) of the optical emitting surface LOP in a case where the origin at the intersection point of the diagonal lines of the screen S having a rectangular shape is defined as (0, 0) are determined, the relational equation between the beam size BS (Beamsize$_H$, Beamsize$_V$) and the projection distance (distance) DS is specified.

It is understood from the relational equations illustrated in the above-described Equations 1 to 8 that, in order to achieve uniformization of the spot size SS of each pixel PX, that is, the size of each pixel PX, the projector PR according to the present embodiment is preferably configured as follows.

The laser light source 1 and the shaping section 2 are configured to satisfy the following predetermined conditions (i) to (iv) in each of the first direction (X-axis direction) and the second direction (Y-axis direction).

(i) A position on the screen S where the incident angle θ of the laser beam LB (see FIG. 5) is the smallest and the projection distance DS of the laser beam LB (see FIG. 1) is the smallest is defined as a first pixel. The first pixel is a pixel corresponding to the point A on the screen S in each of the first direction (X-axis direction) and the second direction (Y-axis direction).

(ii) A position on the screen S where the incident angle θ of the laser beam LB is the smallest and the projection distance DS of the laser beam LB is the largest is defined as a second pixel. When a relationship between the incident angle θ in the first direction (X-axis direction) and the projection distance DS is considered, the second pixel is a pixel corresponding to the point B on the screen S, and when a relationship between the incident angle θ in the second direction (Y-axis direction) and the projection distance DS is considered, the second pixel is a pixel corresponding to the point C on the screen.

(iii) A position on the screen S where the incident angle θ of the laser beam LB is the largest and the projection distance DS of the laser beam LB is the smallest is defined as a third pixel. When the relationship between the incident angle θ in the first direction (X-axis direction) and the projection distance DS is considered, the third pixel is a pixel corresponding to the point C on the screen S, and when the relationship between the incident angle θ in the second direction (Y-axis direction) and the projection distance DS is considered, the third pixel is a pixel corresponding to the point B on the screen.

(iv) A position on the screen S where the incident angle θ of the laser beam LB is the largest and the projection distance DS of the laser beam LB is the largest is defines as a fourth pixel. The fourth pixel is a pixel corresponding to the point D on the screen S in each of the first direction (X-axis direction) and the second direction (Y-axis direction).

Figure 12:
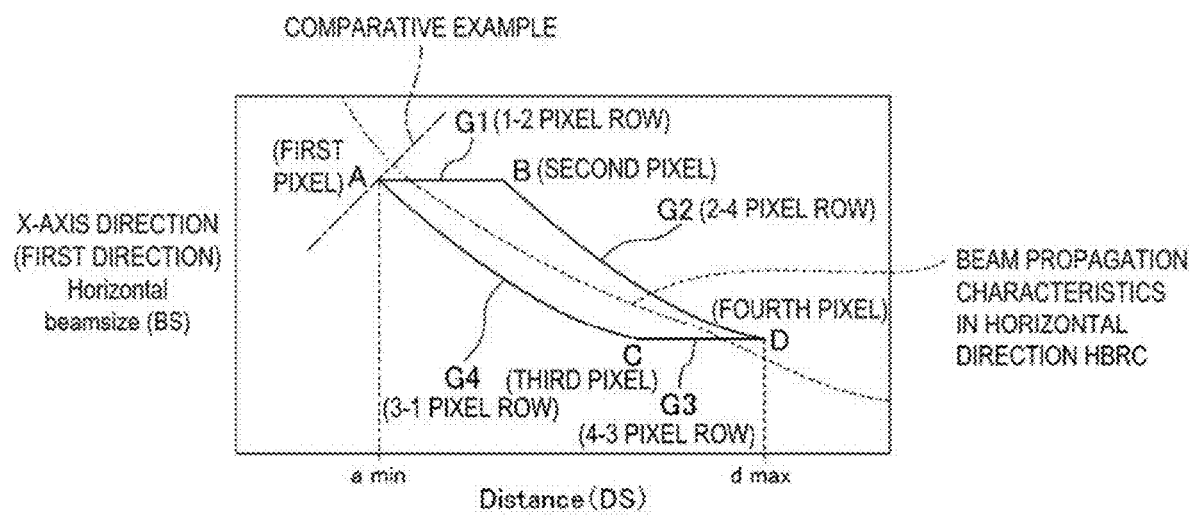
FIG. 12 is a diagram illustrating a relationship between a graph of beam propagation characteristics in the horizontal direction (the X-axis direction, the first direction) of the projector according to the first embodiment and a region surrounded by a first graph, a second graph, a third graph, and a fourth graph.
Figure 13:
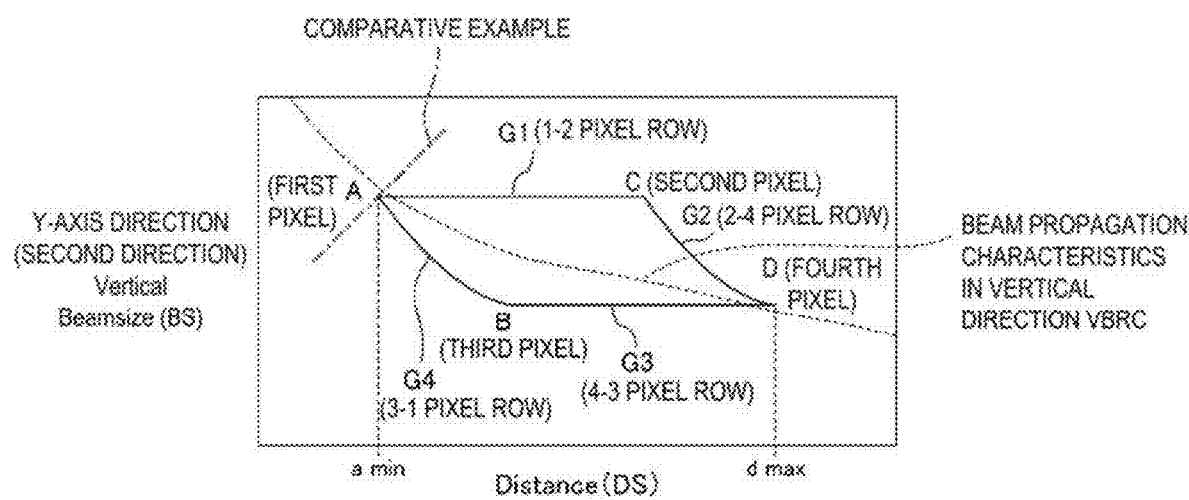
FIG. 13 is a diagram illustrating a relationship between a graph of beam propagation characteristics in the vertical direction (the Y-axis direction, the second direction) of the projector according to the first embodiment and a region surrounded by a first graph, a second graph, a third graph, and a fourth graph.

A first graph G1, a second graph G2, a third graph G3, and a fourth graph G4 illustrated in FIG. 12 and FIG. 13 are graphs indicating the following relationships (I) to (IV).

(I) The first graph G1 illustrates a relationship between the beam size BS and the projection distance DS for a 1-2 pixel row from the first pixel to the second pixel in a case where the sizes of all the pixels on the screen S are assumed to be identical.

(II) The second graph G2 illustrates a relationship between the beam size BS and the projection distance DS for a 2-4 pixel row from the second pixel to the fourth pixel in the case where the sizes of all the pixels on the screen S are assumed to be identical.

(III) The third graph G3 illustrates a relationship between the beam size BS and the projection distance DS for a 4-3 pixel row from the fourth pixel to the third pixel in the case where the sizes of all the pixels on the screen S are assumed to be identical.

(IV) The fourth graph G4 illustrates a relationship between the beam size BS and the projection distance DS for a 3-1 pixel row from the third pixel to the first pixel in the case where the sizes of all the pixels on the screen S are assumed to be identical.

In a case where the sizes of all the pixels PX on the screen S in FIG. 9 are assumed to be identical, the beam sizes BS and the projection distances DS for all the pixels PX in a horizontal direction (the X-axis direction: the first direction) correspond to all the points in the specific region ABDC illustrated in FIG. 12.

As illustrated in FIG. 12, a graph of propagation characteristics in the horizontal direction (the X-axis direction: the first direction) illustrating a relationship between the beam size BS of the laser beam LB and the projection distance DS in the horizontal direction (the X-axis direction: the first direction) is referred to as a graph HBRC. The graph HBRC is specific to structures of the laser light source 1 and the shaping section 2 of the projector PR, and thus, is drawn by using one line instead of being drawn as a region.

As can be seen from FIG. 12, under the conditions of (i) to (iv) described above, the graph HBRC (denoted by a dashed line) of beam propagation characteristics in the horizontal direction of the projector PR according to the present embodiment is as follows. The graph HBRC has a decreasing portion that is drawn in such a manner that the beam size BS decreases as the projection distance DS increases. At least a part of the line of the decreasing portion is drawn so as to overlap the specific region ABDC surrounded by the first graph G1, the second graph G2, the third graph G3, and the fourth graph G4.

The decreasing portion of the graph HBRC (the dashed line) illustrated in FIG. 12 is a portion of the laser beam LB where the beam size BS decreases as the projection distance DS increases, as illustrated in FIG. 6 and FIG. 7. Thus, at least a part of the decreasing portion of the graph HBRC differs from a dashed-dotted line drawn such that the beam size BS increases as the projection distance DS increases for the projector of the comparative example illustrated in FIG. 12.

In FIG. 12, in the graph HBRC (the dashed line), the beam size BS becomes smaller as the projection distance DS increases at all of the positions overlapping the specific region ABDC. However, in the graph HBRC (the dashed line), the beam size BS may become larger as the projection distance DS increases at some positions among the positions overlapping the specific region ABDC.

The decreasing portion of the graph HBRC (the dashed line) in FIG. 12 has a shape that is close to the specific region ABDC, compared to the projector of the comparative example that projects, onto the screen S, only the laser beam LB in a portion that is farther from the projector PR than the beam waist BW as illustrated in FIG. 6 and FIG. 7. As a result, the uniformization of the spot size SS, that is, the uniformization of the sizes of the pixels PX, can be achieved.

However, as illustrated in FIG. 12, the above-described dashed line of the decreasing portion is preferably drawn across at least the overall range from a minimum value amin of the projection distance DS on the screen S to a maximum value dmax of the projection distance DS on the screen S.

The decreasing portion of the graph HBRC of the beam propagation characteristics is, as a whole, a graph having a shape that is close to the specific region ABDC where the beam size BS decreases as the projection distance DS increases. Thus, over the overall range of the projection distance DS from the point A to the point D, an actual relationship between the beam size BS and the projection distance DS is close to the relationship between the beam size BS and the projection distance DS under conditions for drawing the specific region ABDC. As a result, variation in the spot size SS in the X-axis direction (the first direction: the horizontal direction) of the actual laser beam LB on the screen S is further smaller, that is, the spot size SS is further uniformized, as a whole.

The graph HBRC is drawn so as to be away from the specific region ABDC at a position closer to a 1-4 contact (point A) of the first graph G1 and the fourth graph G4 than a 1-2 contact (point B) of the first graph G1 and the second graph G2 or a 3-4 contact (point C) of the third graph G3 and the fourth graph G4. The graph HBRC is drawn so as to be away from the specific region ABDC at a position closer to a 2-3 contact (point D) of the second graph G2 and the third graph G3 than the 1-2 contact (the point B) of the first graph G1 and the second graph G2 or the 3-4 contact (the point C) of the third graph G3 and the fourth graph G4.

According to this configuration, variation in the spot size SS in the X-axis direction (the first direction: the horizontal direction) of the actual laser beam LB on the screen S is further smaller, that is, the spot size SS is further uniformized, as a whole.

Note that the graph HBRC of the beam propagation characteristics is preferably drawn so as to overlap each of the 1-4 contact (the point A) of the first graph G1 and the fourth graph G4 and the 2-3 contact (the point D) of the second graph G2 and the third graph G3. In this way, the uniformization of the spot size SS can be most effectively performed.

When the sizes of all the pixels PX on the screen S in FIG. 9 are assumed to be identical, the beam sizes BS and the projection distances DS for all the pixels PX in the vertical direction (the Y-axis direction: the second direction) each correspond to all the points in the specific region ABDC illustrated in FIG. 13.

As illustrated in FIG. 13, a graph of propagation characteristics in the vertical direction (the Y-axis direction: the second direction) indicating a relationship between the beam size BS of the laser beam LB and the projection distance DS in the vertical direction (the Y-axis direction: the second direction) is referred to as a graph VBRC. The graph VBRC is also specific to the structures of the laser light source 1 and the shaping section 2 of the projector PR, and thus, is drawn by using one line, instead of being drawn as a region.

As illustrated in FIG. 13, under the conditions of (i) to (iv) described above, the graph VBRC (denoted by a dashed line) of beam propagation characteristics of the projector PR according to the present embodiment is as follows. The graph VBRC has a decreasing portion that is drawn in such a manner that the beam size BS decreases as the projection distance DS increases. At least a part of the line of the decreasing portion is drawn so as to overlap the specific region ABDC surrounded by the first graph G1, the second graph G2, the third graph G3, and the fourth graph G4.

The decreasing portion of the graph VBRC (the dashed line) illustrated in FIG. 13 is a portion of the laser beam LB where the beam size BS decreases as the projection distance DS increases, as illustrated in FIG. 6 and FIG. 7. Thus, at least a part of the decreasing portion of the graph VBRC differs from a dashed-dotted line drawn such that the beam size BS increases as the projection distance DS increases for the projector of the comparative example illustrated in FIG. 13.

In FIG. 13, in the graph VBRC (the dashed line), the beam size BS becomes smaller as the projection distance DS increases at all of the positions overlapping the specific region ABDC. However, in the graph VBRC (the dashed line), the beam size BS may become larger as the projection distance DS increases at some positions of the positions overlapping the specific region ABDC.

The decreasing portion of the graph VBRC (the dashed line) in FIG. 13 has a shape that is close to the specific region ABDC, compared to the projector of the comparative example that projects, onto the screen S, only the laser beam LB in a portion that is farther from the projector PR than the beam waist BW as illustrated in FIG. 6 and FIG. 7. As a result, the uniformization of the spot size SS, that is, the uniformization of the sizes of the pixels PX, can be achieved.

However, as illustrated in FIG. 13, the above-described dashed line of the decreasing portion is preferably drawn across at least the overall range from the minimum value amin of the projection distance DS on the screen S to the maximum value dmax of the projection distance DS on the screen S.

The decreasing portion of the graph VBRC of the beam propagation characteristics is, as a whole, a graph having a shape that is close to the specific region ABDC where the beam size BS decreases as the projection distance DS increases. Thus, over the overall range of the projection distance DS from the point A to the point D, an actual relationship between the beam size BS and the projection distance DS is close to the relationship between the beam size BS and the projection distance DS under conditions for drawing the specific region ABDC. As a result, variation in the spot size SS in the Y-axis direction (the second direction: the vertical direction) of the actual laser beam LB on the screen S is further smaller, that is, the spot size SS is further uniformized, as a whole.

The graph VBRC is drawn so as to be away from the specific region ABDC at a position closer to a 1-4 contact (point A) of the first graph G1 and the fourth graph G4 than a 1-2 contact (point C) of the first graph G1 and the second graph G2 or a 3-4 contact (point B) of the third graph G3 and the fourth graph G4. The graph VBRC is drawn so as to be away from the specific region ABDC at a position closer to a 2-3 contact (point D) of the second graph G2 and the third graph G3 than the 1-2 contact (the point C) of the first graph G1 and the second graph G2 or the 3-4 contact (the point B) of the third graph G3 and the fourth graph G4.

According to this configuration, variation in the spot size SS in the Y-axis direction (the second direction: the vertical direction) of the actual laser beam LB on the screen S is further smaller, that is, the spot size SS is further uniformized, as a whole.

Note that the graph VBRC of the beam propagation characteristics is preferably drawn so as to overlap each of the 1-4 contact (point A) of the first graph G1 and the fourth graph G4 and the 2-3 contact (point D) of the second graph G2 and the third graph G3. In this way, the uniformization of the spot size SS can be most effectively performed.

According to the projector PR described above, variation in the beam size BS in each of the horizontal direction (the X-axis direction: the first direction) and the vertical direction (the Y-axis direction: the second direction) of each pixel PX in the specific region ABDC on the screen S in FIG. 9 is small. Thus, the spot size SS of each pixel PX on the screen S in FIG. 9 can be uniformized.

In addition, in order to obtain the effects described above, in the projector PR according to the present embodiment, the structures of the laser light source 1 and the shaping section 2 are only required to be set so as to draw the graphs in FIG. 12 and FIG. 13. Thus, the spot size SS of each pixel PX can be uniformized without complicating the overall configuration of the optical system 23.

Second Embodiment

A projector PR according to a second embodiment will be described. Note that the description of a point where the projector PR according to the present embodiment is similar to the projector PR according to the embodiment described above will not be repeated below. The projector PR according to the present embodiment differs from the projector PR according to the first embodiment in the following points.

Figure 14:
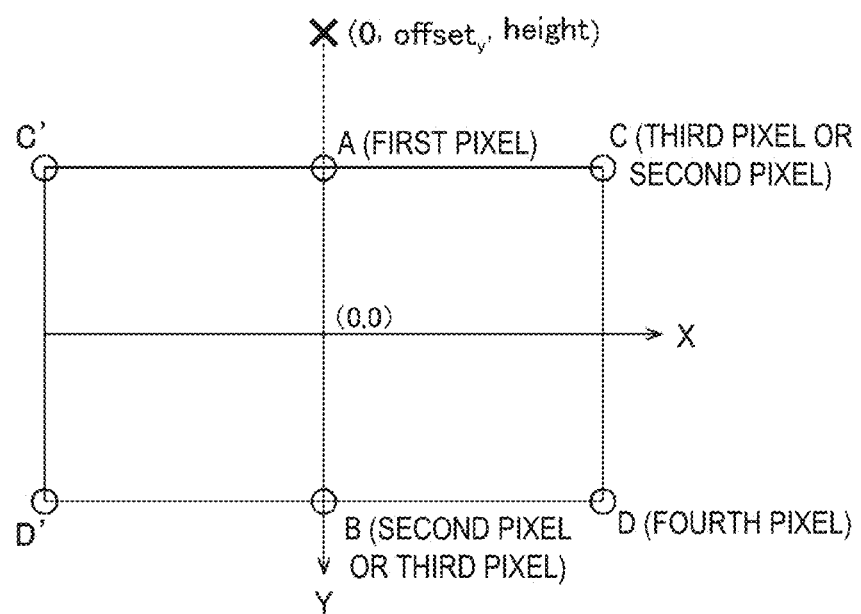
FIG. 14 is a front view for describing a relationship between a position of an optical emitting surface of a projector according to a second embodiment and a position of a screen.
Figure 15:
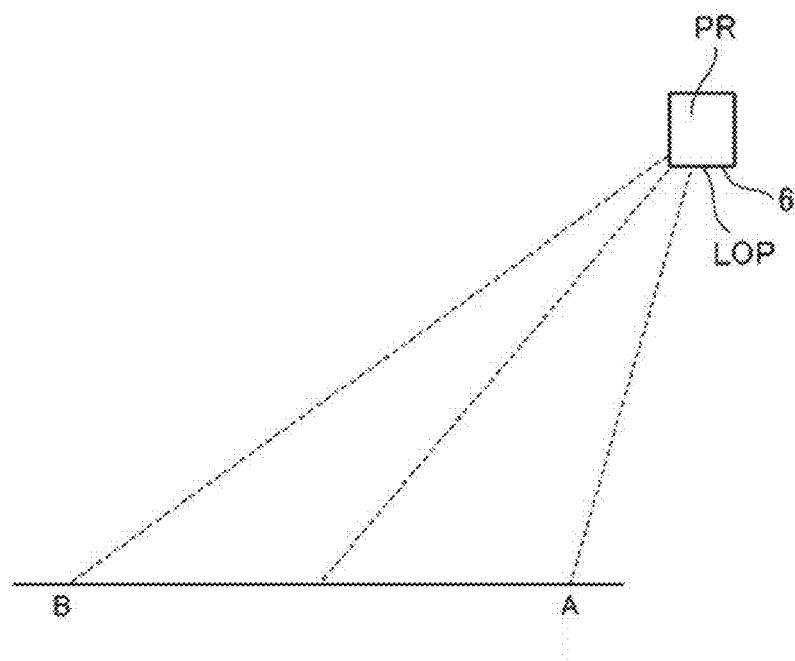
FIG. 15 is a side view illustrating a relationship between a position of the optical emitting surface of the projector according to the second embodiment and a position of a screen, and is a side view of the projector and the screen when the projector and the screen are viewed along the horizontal direction (the X-axis direction, the first direction).
Figure 16:
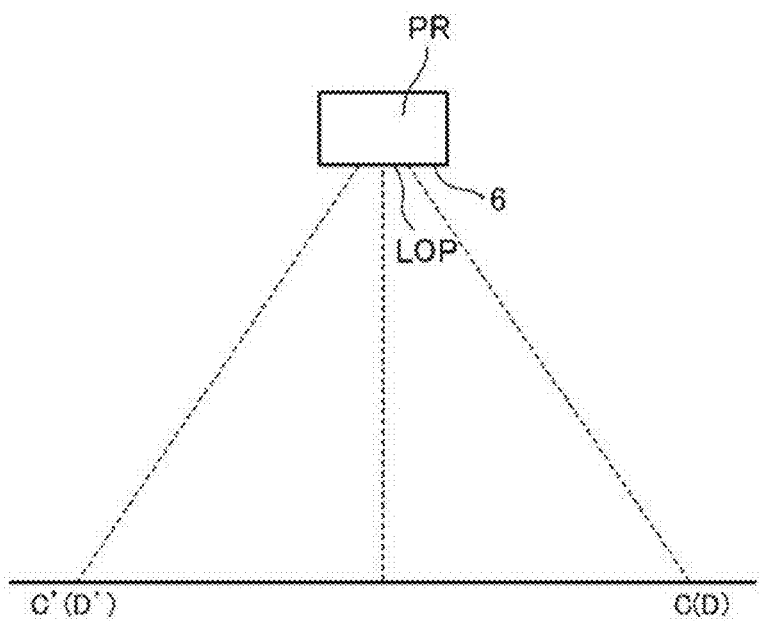
FIG. 16 is a diagram illustrating a relationship between a position of the optical emitting surface of the projector according to the second embodiment and a position of a screen, and is a side view of the projector and the screen when the projector and the screen are viewed along the vertical direction (the Y-axis direction, the second direction).

As illustrated in FIG. 14 to FIG. 16, an optical emitting surface LOP of the projector PR is provided at any position in a direction perpendicular to a virtual plane including a rectangular shape D'DCC' from any point x on a second virtual straight line connecting midpoints of long sides facing each other of the rectangular shape D'DCC'. However, the optical emitting surface LOP may be provided at any position in a direction perpendicular to the virtual plane including the rectangular shape D'DCC' from any point on a first virtual straight line connecting midpoints of short sides facing each other of the rectangular shape D'DCC'.

Note that in the present embodiment, the optical emitting surface LOP is provided at a position other than positions facing a screen S. In other words, the optical emitting surface LOP is provided at a position other than positions on a normal at all positions on the screen S. More specifically, the optical emitting surface LOP is provided at a position being at the outside of the screen S in a direction perpendicular to the virtual plane including the screen S.

Note that the "rectangular shape" according to the present embodiment is specified by a line segment D'-D, a line segment D-C, a line segment C-C', and a line segment C'-D'. The "short side" of the present embodiment is specified by the line segment D-C or the line segment C'-D'. The "first virtual straight line" of the present embodiment is specified by the X-axis. The "long side" of the present embodiment is specified by the line segment C'-C or D'-D. The "second virtual straight line" of the present embodiment is specified by the Y-axis.

In the projector PR according to the present embodiment, the relational equations described in the following Equation 9 and Equation 10 are established under the conditions illustrated in FIG. 9, and FIG. 14 to FIG. 16.

$$A{:}(n, m) = \left(\frac{R_H}{2}, R_V\right), (x_n, y_m) = \left(\frac{p_H}{2}, \frac{-l_V + p_V}{2}\right) \cong \left(0, -\frac{l_V}{2}\right) \quad \text{[Equation 9]}$$

$$B{:}(n, m) = \left(\frac{R_H}{2}, 1\right), (x_n, y_m) = \left(\frac{p_H}{2}, \frac{l_V - p_V}{2}\right) \cong \left(0, \frac{l_V}{2}\right)$$

$$C{:}(n, m) = (1, R_V),$$

$$(x_n, y_m) = \left(\frac{l_H - p_H}{2}, \frac{-l_V + p_V}{2}\right) \cong \left(\frac{l_H}{2}, -\frac{l_V}{2}\right)$$

$$D{:}(n, m) = (1, 1), (x_n, y_m) = \left(\frac{l_H - p_H}{2}, \frac{l_V - p_V}{2}\right) \cong \left(\frac{l_H}{2}, \frac{l_V}{2}\right)$$

The point A to the point D are represented as follows.

$$AC{:} \sqrt{\left(\frac{l_V}{2} + \text{offset}_y\right)^2 + \text{height}^2} \leq \quad \text{[Equation 10]}$$

$$\text{distance} \leq \sqrt{\frac{l_H^2}{4} + \left(\frac{l_V}{2} + \text{offset}_y\right)^2 + \text{height}^2}$$

$$\text{Beamsize}_H =$$

$$p_H \cos\left\{\tan^{-1}\left(\frac{\sqrt{\text{distance}^2 - \text{height}^2 - \left(\frac{l_V}{2} + \text{offset}_y\right)^2}}{\text{height}}\right)\right\}$$

$$\text{Beamsize}_V = p_V \cos\left\{\tan^{-1}\left(\frac{l_V + 2\text{offset}_y}{2\text{height}}\right)\right\}$$

$$AB{:} \sqrt{\left(\frac{l_V}{2} + \text{offset}_y\right)^2 + \text{height}^2} \leq$$

$$\text{distance} \leq \sqrt{\left(\frac{l_V}{2} - \text{offset}_y\right)^2 + \text{height}^2}$$

$$\text{Beamsize}_H = p_H \cos\left\{\tan^{-1}\left(\frac{p_H}{2\text{height}}\right)\right\} \cong p_H$$

$$\text{Beamsize}_V =$$

$$p_V \cos\left\{\tan^{-1}\left(\frac{\sqrt{\text{distance}^2 - \text{height}^2} + \text{offset}_y^2}{\text{height}}\right)\right\}$$

$$BD{:} \sqrt{\left(\frac{l_V}{2} - \text{offset}_y\right)^2} \leq \text{distance} \leq$$

-continued $$\text{Beamsize}_H = \frac{\sqrt{\frac{l_H^2}{4} + \left(\frac{l_V}{2} - \text{offset}_y\right)^2 + \text{height}^2}}{p_H \cos\left\{\tan^{-1}\left(\frac{\sqrt{\text{distance}^2 - \text{height}^2 - \left(\frac{l_V}{2} - \text{offset}_y\right)^2}}{\text{height}}\right)\right\}}$$

$$\text{Beamsize}_V = p_V \cos\left\{\tan^{-1}\left(\frac{l_V - 2\text{offset}_y}{2\text{height}}\right)\right\}$$

$$CD: \sqrt{\frac{l_H^2}{4} + \left(\frac{l_V}{2} + \text{offset}_y\right)^2 + \text{height}^2} \le$$

$$\text{distance} \le \sqrt{\frac{l_H^2}{4} + \left(\frac{l_V}{2} - \text{offset}_y\right)^2 + \text{height}^2}$$

$$\text{Beamsize}_H = p_H \cos\left\{\tan^{-1}\left(\frac{l_H}{2\text{height}}\right)\right\}$$

$$\text{Beamsize}_V = p_V \cos\left\{\tan^{-1}\left(\frac{\sqrt{\text{distance}^2 - \frac{l_H^2}{4} - \text{height}^2} + \text{offset}_y^2}{\text{height}}\right)\right\}$$

In a case of the present embodiment, the relationship between the beam size BS and the projection distance DS for the pixel row that is represented by each of the line segments AC, AB, BD, and CD is represented by the following equations.

A graph of beam characteristics (the beam size BS vs. the projection distance DS) indicating each relationship of Beamsize$_H$(distance) and Beamsize$_V$(distance) overlapping the specific region ABDC is selected.

The relational equation between the beam size BS (Beamsize$_H$, Beamsize$_V$) and the projection distance (distance) DS for each of the above-described line segments AC, CD, DB, and AB in Equation 10 is a relational equation in a case where the sizes of all the pixels PX on the screen S are assumed to be perfectly uniform, that is, to be identical. As can be seen from Equation 10, when position coordinates (offset$_X$, offset$_Y$, and height) of the optical emitting surface LOP in a case where the origin at an intersection point of the diagonal lines of the screen S having the rectangular shape is defined as (0, 0) are determined, the relational equation between the beam size BS (Beamsize$_H$, Beamsize$_V$) and the projection distance (distance) DS is specified.

Figure 17:
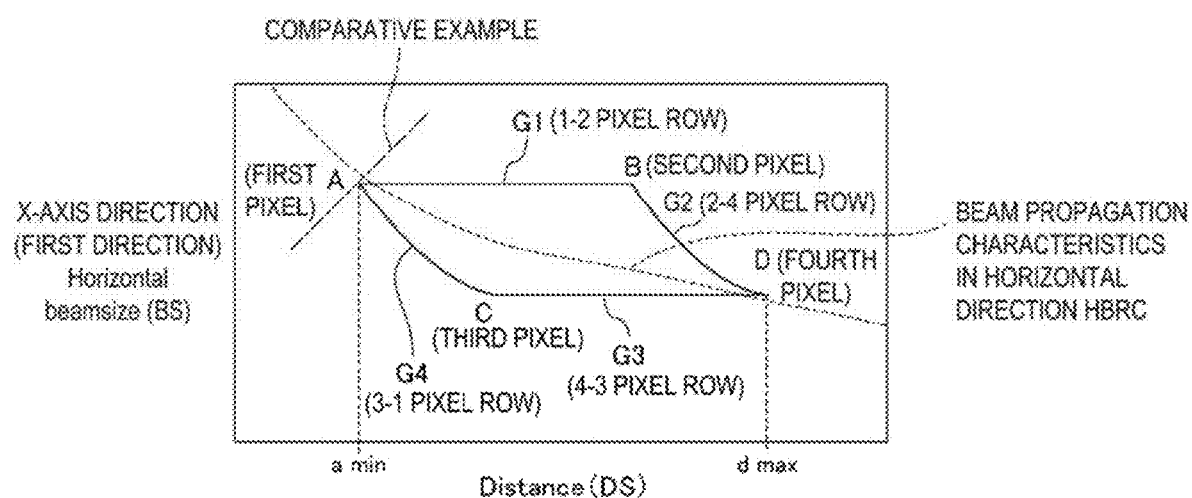
FIG. 17 is a diagram illustrating a relationship between a graph of beam propagation characteristics in the horizontal direction (the X-axis direction, the first direction) of the projector according to the second embodiment and a region surrounded by a first graph, a second graph, a third graph, and a fourth graph.

In a case where the sizes of all the pixels PX on the screen S in FIG. 14 are assumed to be identical, the beam size BS and the projection distance DS for all the pixels PX in a horizontal direction (X-axis direction: first direction) correspond to all the points in a specific region ABDC illustrated in FIG. 17.

As illustrated in FIG. 17, in the present embodiment as well, a part of the line of a graph HBRC is drawn so as to overlap the above-described specific region ABDC surrounded by a first graph G1, a second graph G2, a third graph G3, and a fourth graph G4. Note that as in the first embodiment, the graph HBRC is a graph of propagation characteristics in the horizontal direction (X-axis direction) illustrating a relationship between the beam size BS of the laser beam LB and the projection distance DS in the horizontal direction (the X-axis direction) of the projector PR according to the present embodiment. The graph HBRC is specific to the structures of the laser light source 1 and the shaping section 2 of the projector PR, and thus, is drawn by using one line instead of being drawn as a region.

Thus, in FIG. 17, the graph HBRC of beam propagation characteristics in the horizontal direction of the projector PR has a decreasing portion that is drawn in such a manner that the beam size BS decreases as the projection distance DS increases. At least a part of the line of the decreasing portion is drawn so as to overlap the specific region ABDC.

The decreasing portion of the graph HBRC (the dashed line) illustrated in FIG. 17 is a portion of the laser beam LB where the beam size BS decreases as the projection distance DS increases, as illustrated in FIG. 6 and FIG. 7. Thus, at least a part of the decreasing portion of the graph HBRC differs from a dashed-dotted line drawn such that the beam size BS increases as the projection distance DS increases for the projector of the comparative example illustrated in FIG. 17.

In FIG. 17, in the graph HBRC (the dashed line), the beam size BS becomes smaller as the projection distance DS increases at all of the positions overlapping the specific region ABDC. However, in the graph HBRC (the dashed line), the beam size BS may become larger as the projection distance DS increases at some positions of the positions overlapping the specific region ABDC.

The decreasing portion of the graph HBRC (the dashed line) in FIG. 17 has a shape that is close to the specific region ABDC, compared to the projector of the comparative example that projects, onto the screen S, only the laser beam LB in a portion that is farther from the projector PR than the beam waist BW as illustrated in FIG. 6 and FIG. 7. As a result, the uniformization of the spot size SS, that is, the uniformization of the sizes of the pixels PX, can be achieved.

However, as illustrated in FIG. 17, the above-described dashed line of the decreasing portion is preferably drawn across at least the overall range from the minimum value amin of the projection distance DS on the screen S to the maximum value dmax of the projection distance DS on the screen S.

The decreasing portion of the graph HBRC of the beam propagation characteristics is, as a whole, a graph having a shape that is close to the specific region ABDC where the beam size BS decreases as the projection distance DS increases. Thus, over the overall range of the projection distance DS from the point A to the point D, an actual relationship between the beam size BS and the projection distance DS is close to the relationship between the beam size BS and the projection distance DS under conditions for drawing the specific region ABDC. As a result, variation in the spot size SS in the Y-axis direction (the second direction: the vertical direction) of the actual laser beam LB on the screen S is further smaller, that is, the spot size SS is further uniformized, as a whole.

The graph HBRC is drawn so as to be away from the specific region ABDC at a position closer to a 1-4 contact (the point A) of the first graph G1 and the fourth graph G4 than a 1-2 contact (point B) of the first graph G1 and the second graph G2 or a 3-4 contact (point C) of the third graph G3 and the fourth graph G4. The graph HBRC is drawn so as to be away from the specific region ABDC at a position closer to a 2-3 contact (point D) of the second graph G2 and the third graph G3 than the 1-2 contact (the point B) of the first graph G1 and the second graph G2 or the 3-4 contact (the point C) of the third graph G3 and the fourth graph G4.

Thus, in the graph HBRC of the beam propagation characteristics, variation in the spot size SS in the X-axis direction (the first direction: the horizontal direction) of the actual laser beam LB on the screen S is further smaller, that is, the spot size SS is further uniformized, as a whole.

Note that the graph HBRC of the beam propagation characteristics is preferably drawn so as to overlap each of the 1-4 contact (the point A) of the first graph G1 and the fourth graph G4 and the 2-3 contact (the point D) of the second graph G2 and the third graph G3. In this way, the uniformization of the spot size SS can be most effectively performed.

Figure 18:
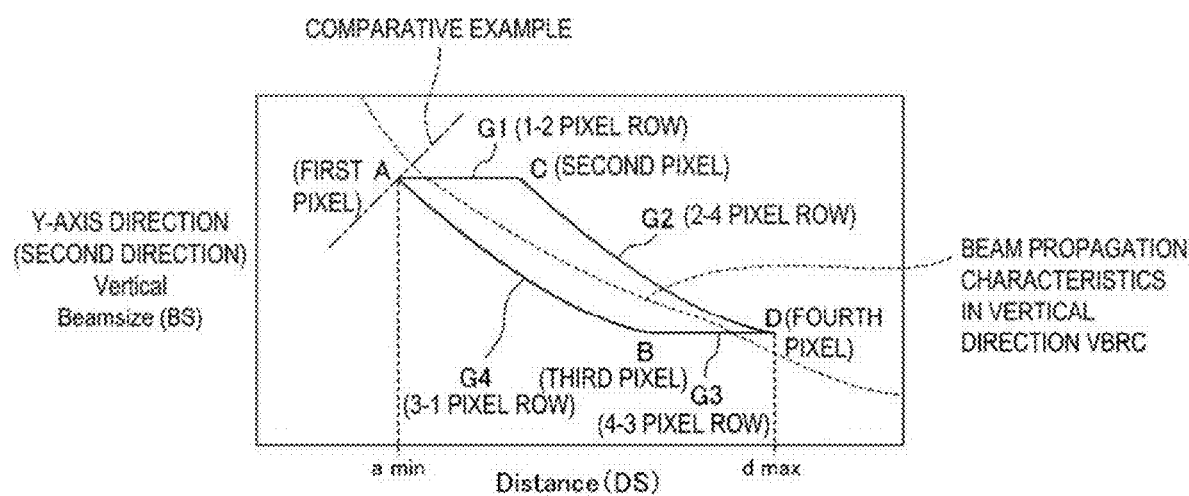
FIG. 18 is a diagram illustrating a relationship between a graph of beam propagation characteristics in the vertical direction (the Y-axis direction, the second direction) of the projector according to the second embodiment and a region surrounded by a first graph, a second graph, a third graph, and a fourth graph.

In a case where the sizes of all the pixels PX on the screen S in FIG. 14 are assumed to be identical, the beam size BS and the projection distance DS for all the pixels PX in the vertical direction (the Y-axis direction: the second direction) correspond to all the points in the specific region ABDC illustrated in FIG. 18.

As illustrated in FIG. 18, in the present embodiment as well, a part of the line of a graph VBRC is drawn so as to overlap the above-described specific region ABDC surrounded by the first graph G1, the second graph G2, the third graph G3, and the fourth graph G4. Note that, as in the first embodiment, the graph VBRC is a graph of propagation characteristics in the vertical direction (the Y-axis direction: the second direction) indicating a relationship between the beam size BS of the laser beam LB and the projection distance DS in the vertical direction (the Y-axis direction: the second direction) of the projector PR according to the present embodiment. The graph VBRC is specific to the structures of the laser light source 1 and the shaping section 2 of the projector PR, and thus, is drawn by using one line instead of being drawn as a region.

Thus, in FIG. 18, the graph VBRC of beam propagation characteristics in the vertical direction of the projector PR has a decreasing portion that is drawn in such a manner that the beam size BS decreases as the projection distance DS increases. At least a part of the line of the decreasing portion is drawn so as to overlap the specific region ABDC.

The decreasing portion of the graph VBRC (the dashed line) illustrated in FIG. 18 is a portion of the laser beam LB where the beam size BS decreases as the projection distance DS increases, as illustrated in FIG. 6 and FIG. 7. Thus, at least a part of the decreasing portion of the graph VBRC differs from a dashed-dotted line drawn such that the beam size BS increases as the projection distance DS increases for the projector of the comparative example illustrated in FIG. 18 as the comparative example.

In FIG. 18, in the graph VBRC (the dashed line), the beam size BS becomes smaller as the projection distance DS increases at all of the positions overlapping the specific region ABDC. However, in the graph VBRC (the dashed line), the beam size BS may become larger as the projection distance DS increases at some positions of the positions overlapping the specific region ABDC.

The decreasing portion of the graph VBRC (the dashed line) in FIG. 18 has a shape that is close to the specific region ABDC, compared to the projector of the comparative example that projects, onto the screen S, only the laser beam LB in a portion that is farther from the projector PR than the beam waist BW as illustrated in FIG. 6 and FIG. 7. As a result, the uniformity of the spot size SS, that is, the uniformity of the sizes of the pixels PX, can be achieved.

However, as illustrated in FIG. 18, the above-described dashed line of the decreasing portion is preferably drawn across at least the overall range from the minimum value amin of the projection distance DS on the screen S to the maximum value dmax of the projection distance DS on the screen S.

The decreasing portion of the graph VBRC of the beam propagation characteristics is, as a whole, a graph having a shape that is close to the specific region ABDC where the beam size BS decreases as the projection distance DS increases. Thus, over the overall range of the projection distance DS from the point A to the point D, an actual relationship between the beam size BS and the projection distance DS is close to the relationship between the beam size BS and the projection distance DS under conditions for drawing the specific region ABDC. As a result, variation in the spot size SS in the Y-axis direction (the second direction: the vertical direction) of the actual laser beam LB on the screen S is small, that is, the spot size SS is uniform, as a whole.

The graph VBRC is drawn so as to be away from the specific region ABDC at a position closer to a 1-4 contact (point A) of the first graph G1 and the fourth graph G4 than a 1-2 contact (point C) of the first graph G1 and the second graph G2 or a 3-4 contact (point B) of the third graph G3 and the fourth graph G4. The graph VBRC is drawn so as to be away from the specific region ABDC at a position closer to a 2-3 contact (the point D) of the second graph G2 and the third graph G3 than the 1-2 contact (the point C) of the first graph G1 and the second graph G2 or the 3-4 contact (the point B) of the third graph G3 and the fourth graph G4.

Thus, in the graph VBRC of the beam propagation characteristics, variation in the spot size SS in the Y-axis direction (the second direction: the vertical direction) of the actual laser beam LB on the screen S is small, that is, the spot size SS is uniformized, as a whole.

Note that the graph VBRC of the beam propagation characteristics is preferably drawn so as to overlap each of the 1-4 contact (the point A) of the first graph G1 and the fourth graph G4 and the 2-3 contact (the point D) of the second graph G2 and the third graph G3. In this way, the uniformization of the spot size SS can be most effectively performed.

From the above, the projector PR according to the present embodiment also has small variation in the beam size BS in each of the horizontal direction (the X-axis direction: the first direction) and the vertical direction (the Y-axis direction: the second direction) of each pixel PX in the specific region ABDC on the screen S in FIG. 14. Thus, the spot size SS of each pixel PX on the screen S in FIG. 14 can be uniformized.

In addition, in order to obtain the effects described above, in the projector PR according to the present embodiment, the structures of the laser light source 1 and the shaping section 2 are only required to be set so as to draw the graphs in FIG. 17 and FIG. 18. Thus, the overall configuration of the optical system 23 is not complicated.

Furthermore, as can be seen from the above-described Equation 9 and Equation 10, calculation for uniformizing the spot size SS of each pixel PX on the screen S can be easily performed.

Figure 19:
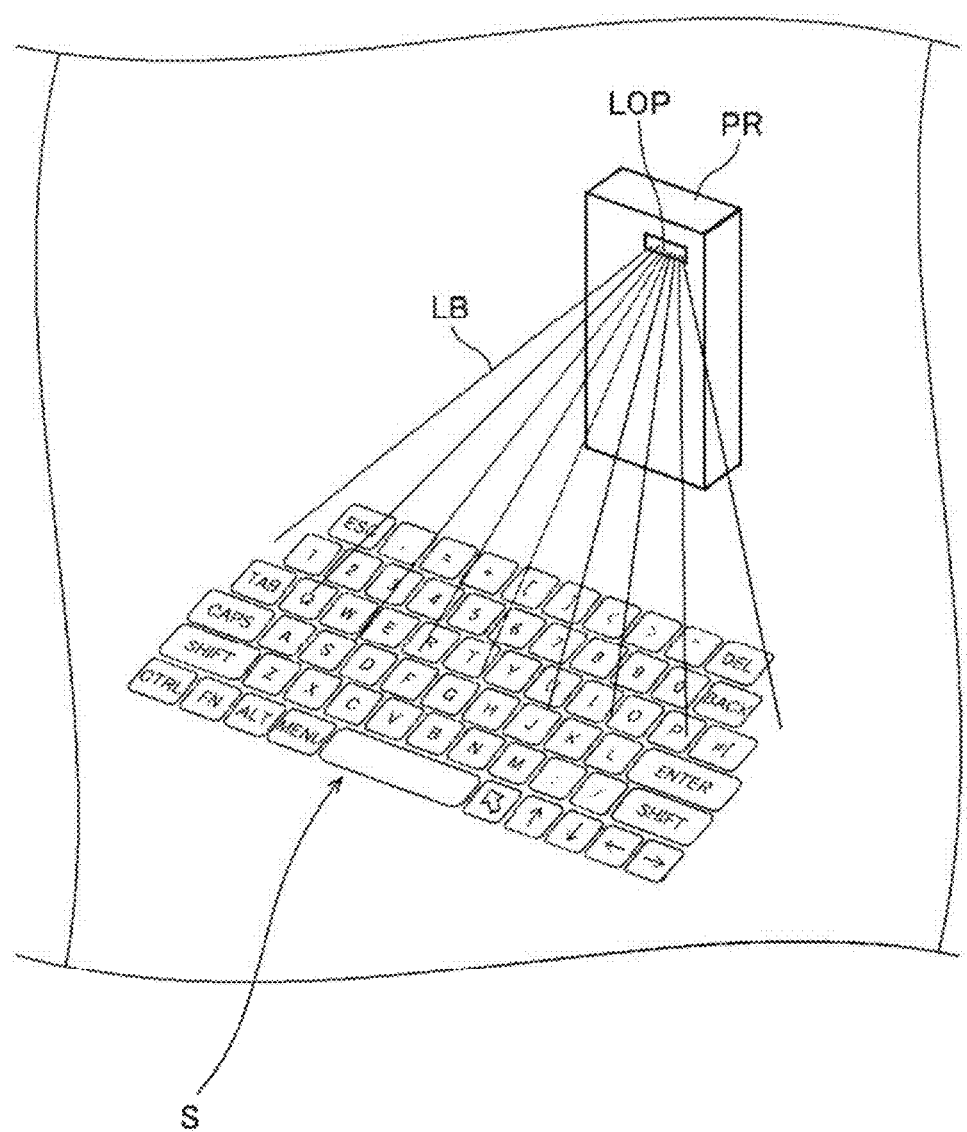
FIG. 19 is a schematic view illustrating an application example of the projector according to the second embodiment.

As illustrated in FIG. 19, according to the projector PR of the present embodiment, a keyboard of a personal computer can be projected on the screen S, which is a surface of a desk, for example.

Figure 20:
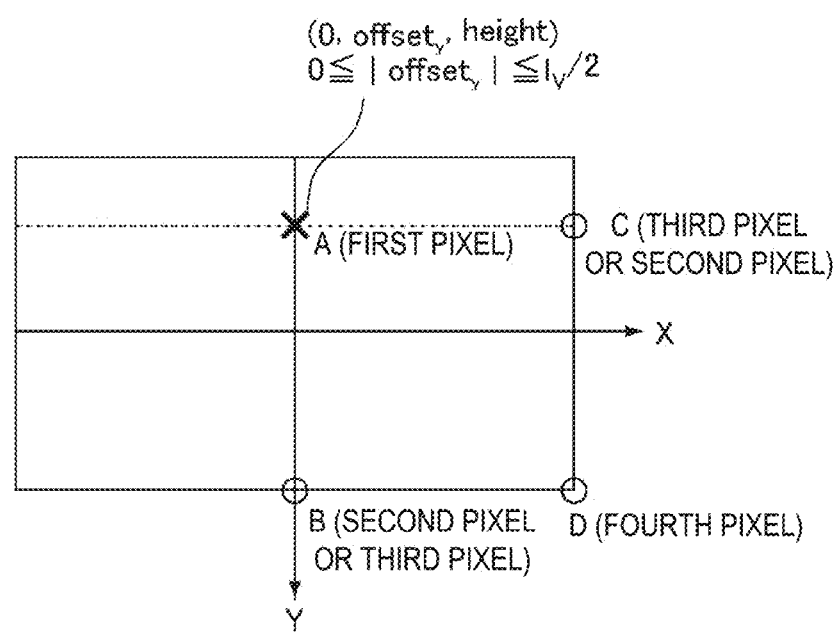
FIG. 20 is a front view illustrating a relationship between a position of an optical emitting surface of a projector according to another example of the second embodiment and a position of a screen.

Note that, instead of the positional relationship between the optical emitting surface LOP and the screen S that has been described by using FIG. 14, even in the positional relationship between the optical emitting surface LOP and the screen S described by using FIG. 20, the spot size SS of each pixel PX on the screen S can be uniformized. In addition, the calculation for uniformizing the spot size SS of each pixel PX on the screen S can be easily performed.

Third Embodiment

A projector PR according to a third embodiment will be described. Note that the description of a point where the projector PR according to the present embodiment is similar to the projector PR according to the embodiment described above will not be repeated below. The projector PR according to the present embodiment differs from the projectors PR according to the first and second embodiments in the following points.

Figure 21:
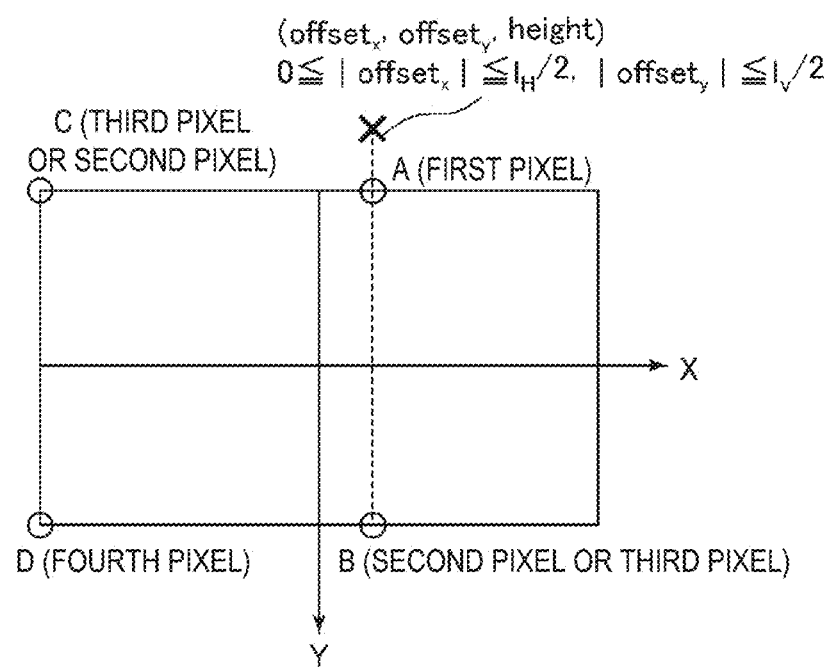
FIG. 21 is a front view for describing a relationship between a position of an optical emitting surface of a projector according to an example of a third embodiment and a position of a screen.
Figure 22:
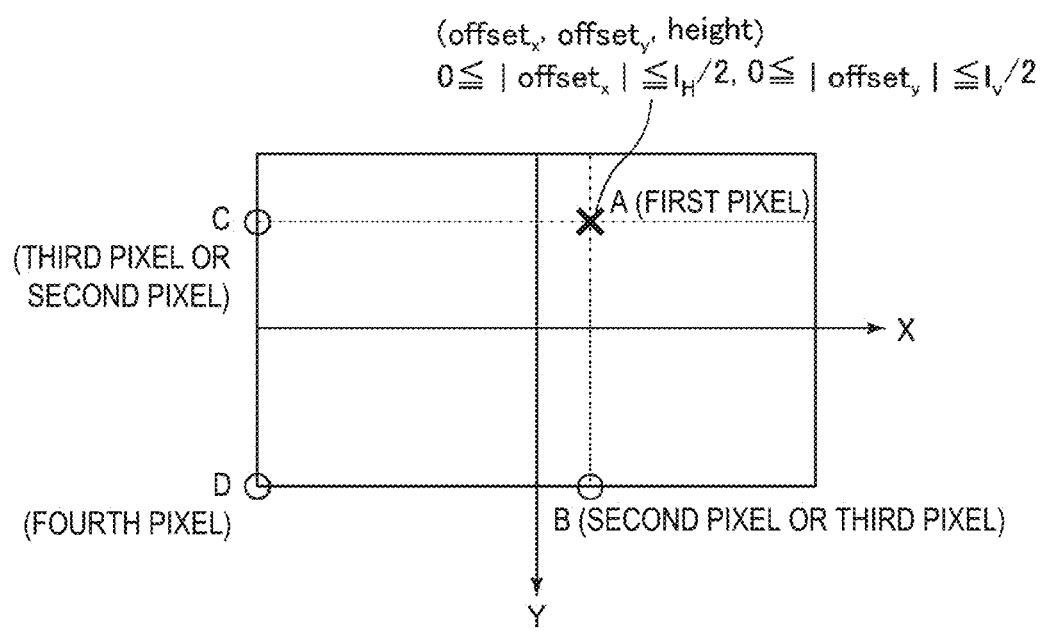
FIG. 22 is a front view illustrating a relationship between a position of an optical emitting surface of a projector according to another example of the third embodiment and a position of a screen.

As illustrated in FIG. 21 and FIG. 22, the laser light source 1 is provided at a position other than any position in a direction perpendicular to a virtual plane including a rectangular shape from any of the points on a first virtual straight line (X-axis) and a second virtual straight line (Y-axis) that have been described above.

Although not illustrated, in the present embodiment as well, a graph HBRC may be drawn in a specific region ABDC surrounded by the first graph G1, the second graph G2, the third graph G3, and the fourth graph G4, as with those illustrated in FIG. 12 and FIG. 17. Note that as with the graph HBRC illustrated in each of FIG. 12 and FIG. 17, the graph HBRC is a graph of propagation characteristics in a horizontal direction (X-axis direction) illustrating a relationship between a beam size BS of a laser beam LB and a projection distance DS in the horizontal direction (the X-axis direction).

Also, although not illustrated, in the present embodiment as well, a graph VBRC may be drawn in the specific region ABDC surrounded by the first graph G1, the second graph G2, the third graph G3, and the fourth graph G4, as with those illustrated in FIG. 13 and FIG. 18. Note that the graph VBRC is a graph of propagation characteristics in a vertical direction (Y-axis direction) illustrating a relationship between the beam size BS of the laser beam LB and the projection distance DS in the vertical direction (the Y-axis direction), as with the graph VBRC illustrated in each of FIG. 13 and FIG. 18.

The projector PR according to the present embodiment can also uniformize a spot size SS of each pixel PX on a screen S for reasons similar to those in the first and second embodiments.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A projector comprising:
   a laser light source;
   a shaping section configured to shape a laser beam emitted from the laser light source; and
   a scanning section configured to two-dimensionally scan, on a screen, the laser beam shaped by the shaping section,
   wherein under a situation where a distance from an optical emitting surface of the laser beam to the screen is constant, the laser light source and the shaping section are configured to perform two-dimensional scanning of the laser beam on the screen by using a tip of the laser beam corresponding to each of cross sections at a plurality of positions of a tapered portion of the laser beam from the scanning section to a beam waist of the laser beam; and
   the laser light source and the shaping section are further configured to project, onto an overall region on the screen, the tip of the laser beam corresponding to each of the cross sections at the plurality of positions of the tapered portion of the laser beam.

2. A projector comprising;
   a laser light source;
   a shaping section configured to shape a laser light emitted from the laser light source; and
   a scanning section configured to two-dimensionally scan, on a screen, a laser beam shaped by the shaping section in a first direction and a second direction perpendicular to the first direction,
   wherein the laser light source and the shaping section are configured to satisfy a predetermined condition in each of the first direction and the second direction,
   the predetermined condition includes when:
      a position on the screen where an incident angle of the laser beam is smallest and a projection distance of the laser beam is smallest is defined as a first pixel;
      a position on the screen where an incident angle of the laser beam is smallest and a projection distance of the laser beam is largest is defined as a second pixel;
      a position on the screen where an incident angle of the laser beam is largest and a projection distance of the laser beam is smallest is defined as a third pixel, and
      a position on the screen where an incident angle of the laser beam is largest and a projection distance of the laser beam is largest is defined as a fourth pixel,
   a graph of a beam propagation characteristic illustrates a relationship between a beam size of the laser beam and a projection distance including a decreasing portion drawn in such a manner that as the projection distance increases, the beam size decreases, and
   at least a part of a line of the decreasing portion being drawn overlapping a specific region is surrounded by a first graph, a second graph, a third graph, and a fourth graph,
      the first graph illustrates a relationship between the beam size and the projection distance for a 1-2 pixel row from the first pixel to the second pixel in a case where sizes of all pixels on the screen are assumed to be identical,
      the second graph illustrates a relationship between the beam size and the projection distance for a 2-4 pixel row from the second pixel to the fourth pixel in a case where sizes of all pixels on the screen are assumed to be identical,
      the third graph illustrates a relationship between the beam size and the projection distance for a 4-3 pixel row from the fourth pixel to the third pixel in a case where sizes of all pixels on the screen are assumed to be identical, and
      the fourth graph illustrates a relationship between the beam size and the projection distance for a 3-1 pixel row from the third pixel to the first pixel in a case where sizes of all pixels on the screen are assumed to be identical.

3. The projector according to claim 2,
   wherein the line of the decreasing portion is drawn across at least an overall range from a minimum value of the projection distance on the screen to a maximum value of the projection distance on the screen.

4. The projector according to claim 2,
   wherein the graph of the beam propagation characteristic is drawn away from the specific region at a position closer to a 1-4 contact of the first graph and the fourth graph than a 1-2 contact of the first graph and the second graph or a 3-4 contact of the third graph and the fourth graph, and drawn away from the specific region at a position closer to a 2-3 contact of the second graph and the third graph than the 1-2 contact of the first graph and the second graph or the 3-4 contact of the third graph and the fourth graph.

5. The projector according to claim 4, wherein the graph of the beam propagation characteristic is drawn overlapping each of the 1-4 contact of the first graph and the fourth graph and the 2-3 contact of the second graph and the third graph.

6. A projector comprising:

a laser light source;

a shaping section configured to shape a laser light emitted from the laser light source; and a scanning section configured to two-dimensionally scan, on a screen, a laser beam shaped by the shaping section, wherein under a situation where a distance from an optical emitting surface of the laser beam to the screen is constant, the laser light source and the shaping section are configured to perform two-dimensional scanning of the laser beam on the screen by using a tip of the laser beam corresponding to each of cross sections at a plurality of positions of a tapered portion of the laser beam from the scanning section to a beam waist of the laser beam, the scanning section scans the laser beam in such a manner that an outline of the screen has a rectangular shape, and the projector further comprises an optical emitting surface that is provided at any position in a direction perpendicular to a virtual plane, the virtual plane including the rectangular shape from any point on a first virtual straight line connecting midpoints of short sides that face each other in the rectangular shape, or any point on a second virtual straight line connecting midpoints of long sides that face each other in the rectangular shape.

7. The projector according to claim 6, wherein the optical emitting surface of the projector is provided at any position in a direction perpendicular to the rectangular shape from an intersection point of the first virtual straight line and the second virtual straight line.

8. The projector according to claim 6, wherein the optical emitting surface of the projector is provided at a position in a direction perpendicular to the virtual plane outside the screen.

9. The projector according to claim 6, further comprising:

a plurality of the laser light sources; and a plurality of multiplexing sections corresponding to the plurality of the laser light sources having a one-to-one relationship, each of the plurality of multiplexing sections being configured to multiplex a plurality of laser beams including the laser beam.

10. The projector according to claim 9, wherein each of the plurality of laser beams has a peak wavelengths different from another one.

11. The projector according to claim 9, wherein a position of a beam waist of each of the plurality of laser beams is identical.

\* \* \* \* \*